United States Patent
Roeh et al.

(10) Patent No.: US 10,243,978 B2
(45) Date of Patent: *Mar. 26, 2019

(54) DETECTING ATTACKS USING PASSIVE NETWORK MONITORING

(71) Applicant: ExtraHop Networks, Inc., Seattle, WA (US)

(72) Inventors: Thomas Lawrence Roeh, Katy, TX (US); Samuel Kanen Clement, Brentwood, TN (US); John Augustus Kiefer, Klein, TX (US)

(73) Assignee: ExtraHop Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/694,229

(22) Filed: Sep. 1, 2017

(65) Prior Publication Data
US 2018/0145995 A1    May 24, 2018

Related U.S. Application Data

(63) Continuation of application No. 15/356,381, filed on Nov. 18, 2016, now Pat. No. 9,756,061.

(51) Int. Cl.
| | | |
|---|---|---|
| *H04L 29/06* | (2006.01) | |
| *H04L 12/861* | (2013.01) | |
| *H04L 12/26* | (2006.01) | |

(52) U.S. Cl.
CPC ........ *H04L 63/1416* (2013.01); *H04L 43/062* (2013.01); *H04L 43/12* (2013.01);
(Continued)

(58) Field of Classification Search
CPC ............. H04L 63/1416; H04L 63/0245; H04L 63/1408; H04L 43/12; H04L 43/062;
(Continued)

(56) References Cited

U.S. PATENT DOCUMENTS

| | | |
|---|---|---|
| 6,141,686 A | 10/2000 | Jackowski et al. |
| 7,509,680 B1 | 3/2009 | Sallam |

(Continued)

OTHER PUBLICATIONS

Official Communication for U.S. Appl. No. 13/831,626 dated Sep. 3, 2013, 17 pages.
(Continued)

*Primary Examiner* — Abu S Sholeman
(74) *Attorney, Agent, or Firm* — John W. Branch; Lowe Graham Jones PLLC

(57) ABSTRACT

Embodiments are directed to detecting one or more attacks in a network. One or more network flows may be monitored using one or more network monitoring computers (NMCs). If one or more file write operations are detected based on information included in one or more packets of the one or more network flows, one or more detection rules may be executed to analyze one or more portions of the one or more packets to identify file information that is associated with the one or more file write operations. One or more metrics may be provided based on the one or more detection rules and one or more of the file information, the one or more file write operations, or the like. If one or more metrics exceed one or more threshold values, one or more reports of one or more attacks may be provided.

20 Claims, 12 Drawing Sheets

(52) U.S. Cl.
CPC .......... *H04L 43/16* (2013.01); *H04L 49/9047* (2013.01); *H04L 63/0245* (2013.01); *H04L 63/1408* (2013.01); *H04L 63/1425* (2013.01); *H04L 63/20* (2013.01)

(58) Field of Classification Search
CPC ..... H04L 43/16; H04L 49/9047; H04L 63/20; H04L 63/1425; H04L 29/06; H04L 12/26; H04L 12/861
USPC ...................................................... 726/22, 23
See application file for complete search history.

(56) References Cited

U.S. PATENT DOCUMENTS

| | | | |
|---|---|---|---|
| 7,810,151 | B1 | 10/2010 | Guruswamy |
| 7,864,764 | B1 | 1/2011 | Ma et al. |
| 7,936,682 | B2 | 5/2011 | Singh et al. |
| 8,125,908 | B2 | 2/2012 | Rothstein et al. |
| 8,185,953 | B2 | 5/2012 | Rothstein et al. |
| 9,367,687 | B1* | 6/2016 | Warshenbrot ......... G06F 21/566 |
| 9,430,646 | B1 | 8/2016 | Mushtaq et al. |
| 9,565,202 | B1 | 2/2017 | Kindlund et al. |
| 2005/0091341 | A1 | 4/2005 | Knight et al. |
| 2005/0100000 | A1 | 5/2005 | Faulkner et al. |
| 2006/0029096 | A1 | 2/2006 | Babbar et al. |
| 2006/0123477 | A1 | 6/2006 | Raghavan et al. |
| 2006/0230452 | A1 | 10/2006 | Field |
| 2009/0089326 | A1 | 4/2009 | Balasubramanian |
| 2010/0226301 | A1 | 9/2010 | Lohmar et al. |
| 2010/0281539 | A1* | 11/2010 | Burns ................. H04L 63/1441 726/23 |
| 2011/0019574 | A1 | 1/2011 | Malomsoky et al. |
| 2011/0197276 | A1 | 8/2011 | Dorrendorf et al. |
| 2011/0321160 | A1 | 12/2011 | Mohandas et al. |
| 2012/0030731 | A1 | 2/2012 | Bhargava et al. |
| 2012/0215328 | A1 | 8/2012 | Schmelzer |
| 2013/0064084 | A1 | 3/2013 | Babbar et al. |
| 2013/0227259 | A1 | 8/2013 | Kim |
| 2015/0058987 | A1 | 2/2015 | Thure et al. |
| 2015/0089034 | A1 | 3/2015 | Stickle et al. |
| 2015/0180890 | A1 | 6/2015 | Ronen et al. |
| 2015/0242627 | A1 | 8/2015 | Lee et al. |
| 2015/0277802 | A1 | 10/2015 | Oikarinen et al. |
| 2016/0006766 | A1 | 1/2016 | Joo |
| 2016/0197949 | A1 | 7/2016 | Nyhuis et al. |
| 2016/0255115 | A1* | 9/2016 | Mital .................. H04L 63/1433 726/1 |
| 2018/0124078 | A1* | 5/2018 | Hajmasan .......... H04L 63/1425 |

OTHER PUBLICATIONS

Official Communication for U.S. Appl. No. 15/356,381 dated Jan. 6, 2017, 57 pages.

Official Communication for U.S. Appl. No. 15/356,381 dated Jul. 3, 2017, 21 pages.

* cited by examiner

DETECTING ATTACKS USING PASSIVE NETWORK MONITORING

CROSS-REFERENCE TO RELATED APPLICATION(S)

This Utility Patent Application is a Continuation of U.S. patent application Ser. No. 15/356,381 filed on Nov. 18, 2016, now U.S. Pat. No. 9,756,061 issued on Sep. 5, 2017, the benefit of which is claimed under 35 U.S.C. § 120, and which is further incorporated by reference in its entirety.

TECHNICAL FIELD

The present innovations relate generally to network monitoring and more particularly, but not exclusively, to monitoring network traffic in a distributed network environment.

BACKGROUND

Attacks against computers and computer networks are increasingly putting information security risk. Attacks that include ransomware extortion has cost victims hundreds of millions of dollars in down time and extorted fees. Example sources of attacks include emails (e.g., emails that include links, attachments, or the like), compromised or malicious websites (e.g., drive-by attacks, spoofing, or the like), portable memory devices (e.g., thumb drives that contain Trojans), or the like.

Classic approaches (e.g., perimeter defenses and agent-based antivirus tools) to information security typically attempt to prevent attacks from starting. For example, perimeter defenses (e.g., firewalls) typically establish a barrier between an internal network and an external network. Perimeter defenses typically establish the barrier by screening for known, malicious origination vectors (e.g., IP addresses, URLs, emails, DNS queries, or the like). Origination vectors change constantly, even over a course of a single day. Accordingly, perimeter defenses are unlikely to be completely impenetrable. Moreover, perimeter defenses fail to protect the internal network from attacks that originate or spread from within the internal network.

Agent-based antivirus tools (e.g., an agent independently running in a local machine, an agent running in a local machine and used by a cloud antivirus tool, or the like) typically employ one or more of sandboxes (e.g., via virtual machines), behavior classification (e.g., via data-mining of files being analyzed), signature analysis (e.g., heuristic signature analysis) of a file itself, or the like. Agent-based antivirus tools that monitor file actions (e.g., via sandboxes or data-mining) are typically prohibitively slow. Agent-based antivirus tools that analyze file signatures have proven to be ineffective in protecting against some attacks such as ransomware attacks (e.g., more than 4,000 ransomware attacks have occurred per day in 2016).

Thus, it is with respect to these considerations and others that the present innovations have been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of the Various Embodiments, which is to be read in association with the accompanying drawings, wherein.

DETAILED DESCRIPTION OF THE VARIOUS EMBODIMENTS

Figure 1:
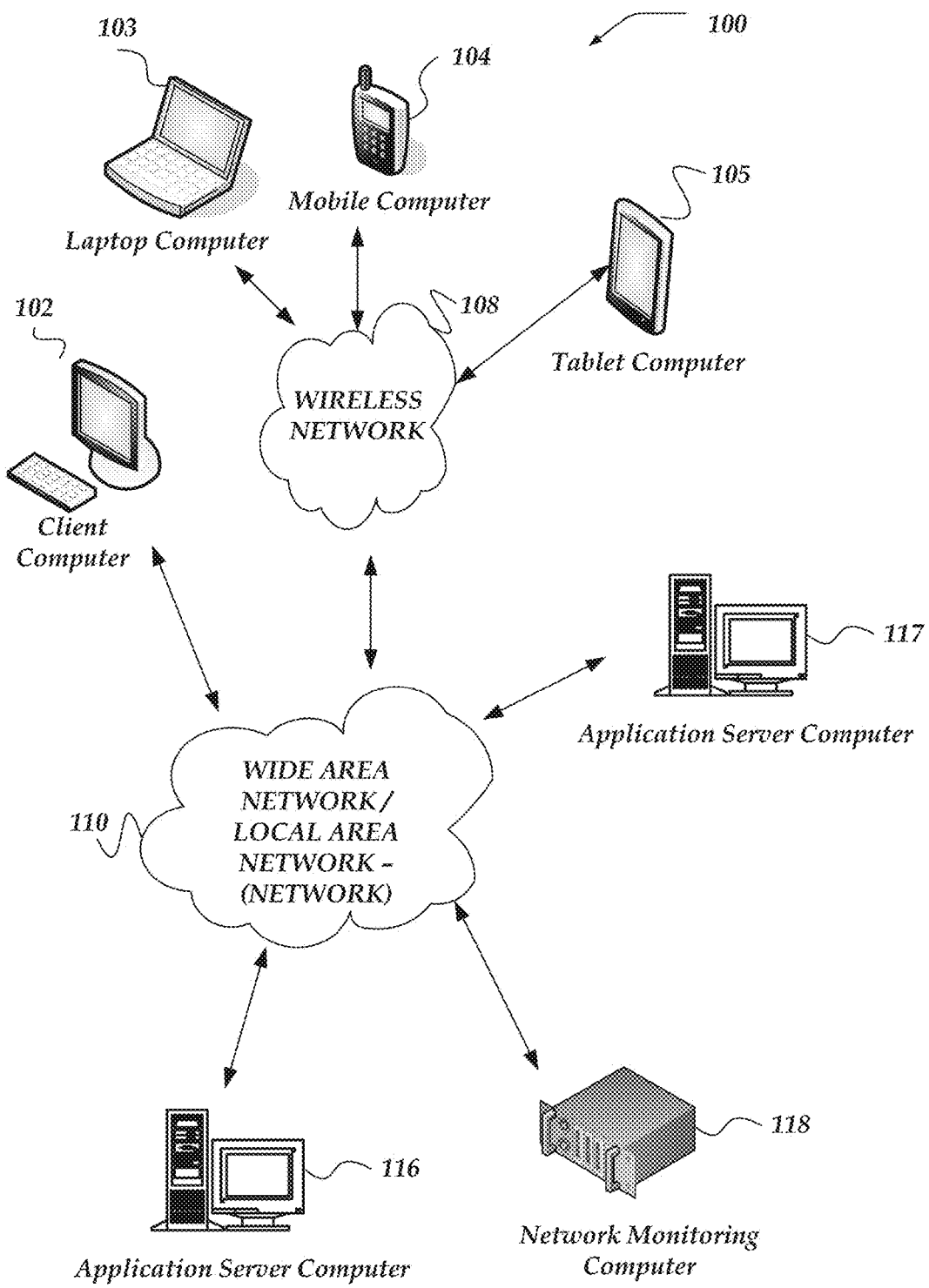
FIG. 1 shows an exemplary system environment in which various embodiments may be implemented.

Various embodiments now will be described more fully hereinafter with reference to the accompanying drawings, which form a part hereof, and which show, by way of illustration, specific exemplary embodiments by which the innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on." Also, throughout the specification and the claims, the use of "when" and "responsive to" do not imply that associated resultant actions are required to occur immediately or within a particular time period. Instead, the terms "when" and "responsive to" are used herein to indicate actions that may occur or be performed in response to one or more conditions being met, unless the context clearly dictates otherwise. Additionally, throughout the specification, the use of "exemplary" does not imply that other embodiments do not perform as well or are not as worthy of illustration. Instead, the term is used herein to emphasize that each element or function described by the term is an example element or function.

For example embodiments, the following terms are also used herein according to the corresponding meaning, unless the context clearly dictates otherwise.

As used herein, the term "session" refers to a semi-permanent interactive packet interchange between two or more communicating endpoints, such as network devices. A session is set up or established at a certain point in time and torn down at a later point in time. An established communication session may involve more than one message in each direction. A session may have stateful communication where one or more communicating network devices saves information about a session history to communicate with another of the endpoints. A session may also provide stateless communication where communicating network devices communicate with independent requests and responses between the endpoints. An established session is a basic requirement to perform a connection-oriented communication. A session also is a basic step to transmit in connectionless communication modes.

As used herein, the terms "network connection" and "connection" refer to a communication session with a semi-permanent connection for interactive packet interchange between two or more communicating endpoints, such as network devices, where a stream of data is delivered in the same or different order than it was sent. The connection may be established before application data is transferred. An alternative to connection-oriented transmission is connectionless communication. For example, a datagram mode of communication used by Internet Protocol (IP) and Universal Datagram Protocol (UDP), which may deliver packets out of order because different packets may be routed independently and could be delivered over different paths. Packets associated with a Transmission Control Protocol (TCP) connection may also be routed independently and could be delivered over different paths. However, for TCP connections, a network communication system may provide packets to application endpoints in the same order that they were sent.

As used herein, the terms "session flow" and "network flow" refer to one or more network packets or a stream of network packets that are communicated in a session that is established between two or more endpoints, such as two network devices. In one or more of the various embodiments, flows may be useful if one or more endpoints of a session may be behind a network traffic management device, such as a firewall, switch, router, load balancer, or the like. In some of the various embodiments, such flows may be used to ensure that packets sent between endpoints of a flow may be routed appropriately.

Typically, establishing a TCP based connection between endpoints begins with execution of an initialization protocol and creates a single bi-directional flow between two endpoints, e.g., one direction of flow going from endpoint A to endpoint B while the other direction of the flow goes from endpoint B to endpoint A, where each endpoint is identified by one or more of an IP address, a TCP port, or the like. Also, some protocols or network applications may establish a separate flow for control information that enables management of one or more flows between two or more endpoints. Further, in some embodiments, network flows may be half-flows that may be unidirectional.

As used herein, the terms "tuple," "tuple information" refer to a set of values that identify a source and destination of a network packet, which may, under some circumstances, be a part of a network connection. In one embodiment, a tuple may include a source IP address, a destination IP address, a source port number, a destination port number, virtual LAN segment identifier (VLAN ID), tunnel identifier, routing interface identifier, physical interface identifier, or a protocol identifier. Tuples may be used to identify network flows.

As used herein the term "related flows" or "related network flows" as used herein are network flows that, while separate, are operating cooperatively. For example, some protocols, such as File Transfer Protocol (FTP), Session Initiation Protocol (SIP), Real-time Transport Protocol (RTP), Voice over Internet Protocol (VOIP), custom protocols, or the like, may provide control communication over one network flow and data communication over other network flows. Further, configuration rules may define one or more criteria that are used to recognize that two or more network flows should be considered related flows. For example, configuration rules may define that flows containing a particular field value should be grouped with other flows having the same field value, such as a cookie value, or the like.

As used herein, the terms "network monitor," "network monitoring computer," or "NMC" refer to an engine (software, hardware, or some combination) that is arranged to monitor and record flows of packets in a session that are communicated between two or more endpoints over one or more networks. The NMC can provide information for assessing different aspects of these monitored flows. In one or more embodiments, the NMC may passively monitor network packet traffic without participating in communication protocols. This monitoring may be performed for a variety of reasons, including troubleshooting and proactive remediation, end-user experience monitoring, Service Level Agreement (SLA) monitoring, capacity planning, application lifecycle management, infrastructure change management, infrastructure optimization, business intelligence, security, and regulatory compliance. The NMC can receive network communication for monitoring through a variety of means including network taps, wireless receivers, port mirrors, SPANs, encapsulated remote switched port analyzers (ESPANs), remote switched port analyzers (RSPANs), remote packet capture systems (RPCAP), or directed tunnels from network switches, clients, or servers including the endpoints themselves or other infrastructure devices. In some of the various embodiments, the NMC may receive a copy of each packet in a particular network segment or virtual local area network (VLAN). Also, for some of the various embodiments, they may receive these packet copies through a port mirror in a managed Ethernet switch, e.g., a Switched Port Analyzer (SPAN) port, a Roving Analysis Port (RAP), or the like, or combination thereof. Port mirroring enables analysis and debugging of network communications. Port mirroring can be performed for inbound or outbound traffic (or both) in single or multiple interfaces.

In some embodiments, the NMC may be arranged to continuously capture network packets that may be associated with one or more monitored network flows. Accordingly, in one or more of the various embodiments, the NMC may be arranged to selectively capture some or all of the network packets that may be monitored or otherwise observed by the NMC. The selection of network packets for capture may be based on the operation of one or more rule-based policies, pattern matches, configuration settings, or the like, or combination thereof.

In one or more of the various embodiments, captured network packets may be stored temporally in ring buffer memories. Also, in one or more of the various embodiments, captured network packets may be stored in persistent data storage, such as disk drives, storage area networks (SANs), solid-state drives, cloud-based storage environments, or the like, or combination thereof.

The NMC may track network connections from and to end points such as a client or a server. The NMC may also extract information from packets including protocol information at various layers of a communication protocol stack. The NMC may reassemble or reconstruct a stream of data exchanged between endpoints. The NMC may perform decryption of a payload at various layers of a protocol stack. The NMC may passively monitor network traffic or it may participate in protocols as a proxy. The NMC may attempt to classify network traffic according to communication protocols that are used by the traffic.

The NMC may also perform one or more actions for classifying protocols that may be a necessary precondition for application classification. While some protocols run in well-known ports, others do not. Also, even if there is traffic in a well-known port, it is not necessarily a protocol generally understood to be assigned to that port. As a result, the NMC may perform protocol classification using one or more techniques, such as signature matching, statistical analysis, traffic analysis, and other heuristics. In some cases, the NMC may use adaptive protocol classification techniques where information used to classify protocols may be accumulated or applied over time to further classify observed protocols. In some embodiments, NMCs may be arranged to employ stateful analysis. Accordingly, for each supported protocol, the NMC may use network packet payload data to drive a state machine that mimics protocol state changes in client/server flows being monitored. The NMC may categorize traffic where categories might include file transfers, streaming audio, streaming video, database access, interactive gaming, or the like. The NMC may attempt to determine whether traffic corresponds to known communications protocols, such as Hypertext Transfer Protocol (HTTP), FTP, Simple Mail Transfer Protocol (SMTP), RTP, Tabular Data Stream (TDS), TCP, IP, or the like.

In one or more of the various embodiments, NMCs or NMC functionality may be implemented using hardware or software based proxy devices that may be arranged to intercept network traffic in monitored networks. The proxy devices may operate as one or more NMCs or may forward one or more copies of one or more packets in the intercepted network traffic to one or more NMCs.

As used herein, the terms "layer" and "model layer" refer to a layer of one or more communication protocols in a stack of communication protocol layers that are defined by a model, such as the OSI model and the TCP/IP (IP) model. As explained below, the OSI model is defined as having seven layers associated with various communication protocols while the TCP/IP model is defined as having four layers associated with the TCP/IP protocol.

For example, at the OSI model's lowest or first layer (Physical), streams of electrical/light/radio impulses (bits) are communicated between computing devices over some type of media, such as cables, network interface cards, radio wave transmitters, or the like. At the next or second layer (Data Link), bits are encoded into packets and packets are also decoded into bits. The Data Link layer also has two sub-layers, a Media Access Control (MAC) sub-layer and a Logical Link Control (LLC) sub-layer. The MAC sub-layer controls how a computing device gains access to data and permission to transmit it. The LLC sub-layer controls frame synchronization, flow control, and error checking. At the third layer (Network), logical paths are created, known as virtual circuits, to communicated data from node to node. Routing, forwarding, addressing, internetworking, error handling, congestion control, and packet sequencing are functions of the Network layer. At the fourth layer (Transport), transparent transfer of data between end computing devices, or hosts, is provided. The Transport layer is responsible for end to end recovery and flow control to ensure complete data transfer over a network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption, is provided by translating from application to network format and vice versa. Generally, the Presentation layer transforms data into a form that protocols at the Application layer (7) can accept. For example, the Presentation layer generally handles formatting and encrypting/decrypting of data that is communicated across a network.

At the top or seventh layer (Application) of the OSI model, application and end user processes are supported. For example, communication partners may be identified, quality of service can be identified, user authentication and privacy may be considered, and constraints in data syntax can be identified. Generally, the Application layer provides services for file transfer, messaging, and displaying data. Protocols at the Application layer include FTP, HTTP, and Telnet.

As explained above, to reduce the number of layers from seven to four, the TCP/IP model collapses the OSI model's Application, Presentation, and Session layers into its Application layer. As also explained above, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

As used herein, the terms "network flow turn," "flow turn," and "turn" refer to an instant when a network flow changes direction. NMCs may be arranged to implement traffic analysis that includes turn detection. Turn detection may include analyzing a monitored flow to determine if data is flowing in one direction (e.g., from network endpoint A to network endpoint B) followed by data flowing in the other direction (e.g., from network endpoint B to network endpoint A). This change of flow direction may, for some protocols, indicate a request-response pattern. In other protocols every other turn may correspond to a new transaction. If a turn is detected, an NMC may be arranged to search for a known sequence or pattern that corresponds to a protocol request or response at a beginning of a turn. NMCs may be configured to use various metrics for identifying a turn, such as changes in traffic flow rate, changes in traffic flow value, sequence matching, response delay/latency, or the like, or combination thereof. Accordingly, one or more threshold values may be configured for detecting turns. Also, knowledge of a particular protocol, application, or the like, may be employed using rules/conditions to help detect turns. In some embodiments, one or more metrics, threshold values, rules, or the like, may be combined together to provide heuristics that may be used for detecting turns.

As used herein, the terms "SnapLen," "Snap Length," or "snapshot value" refer to a value that defines an amount of data captured from a network packet by an NMC or other packet-capture device. A snapshot value may set to an arbitrary value up to or exceeding a length of a network packet. In other cases, the snapshot value may be set to be less than a size of network packet. In some cases, the snapshot value may be set to capture an entire network packet regardless of its length. The snapshot value may be measured from a beginning of a network packet. However, a capturing system (e.g., an NMC) may be configured to begin counting traffic after a defined offset position in a packet. For example, for TCP protocol packets, an NMC may be configured to use a snapshot value of 512 bytes starting from a TCP header thus excluding IP header information from a snapshot value count. Other snapshot value configurations may be defined as well. In some cases, capturing data from network packets using a snapshot value to limit a number of bytes captured may be referred to as packet slicing. In some embodiments, a snapshot value may be a data structure that includes additional properties. Also, in some cases, a snapshot value may be defined based on time duration rather than byte count.

As used herein, the term "blacklist" indicates one or more collections of information that represents one or more prohibited elements. In contrast, the term "whitelist" is used herein to indicate one or more collections of information that represents one or more permitted elements. For example, one or more data types or data structures (e.g., one or more containers, strings, arrays, maps, sets, tables, lists, databases, or the like) may include one or more of one or more blacklists or one or more whitelists.

As used herein, the term "file information" refers generally to files or file portions that may be stored in a file system or communicated over a network. File information may include file contents, filenames, file extensions, metadata, access permissions, file format information, one or more file attributes, symbolic links, hard links, paths, directories, or the like that may be associated with computer files.

As used herein, the term "file operation" indicates one or more logical file activities performed in accordance with one or more file system protocols used for writing, modifying, or reading files in a computer file system. One or more protocol methods (or operations) may, individually or in combination, represent a logical file activity. Various file system protocols, such as Server Message Block (SMB) protocol, one or more dialects of SMB protocol such as Common Internet File System (CIFS) protocol, Network File System (NFS) protocol, Apple Filing Protocol (AFP), or the like, may be arranged to perform the same or similar logical file activities using different protocol methods.

As used herein, the term "file read operation" indicates one or more logical READ activities. For example, when considering CIFS protocol, a logical file READ activity may include one or more of SMB_COM_READ_ANDX, SMB_COM_QUERY_INFORMATION, SMB_COM_TRANSACTION2, TANS2_QUERY_PATH_INFORMATION, SMB_COM_CHECK_DIRECTORY, TRANS_READ_NMPIPE, SMB_FIND_FILE_NAMES_INFO, or the like.

As used herein, the term "file write operation" indicates one or more logical file WRITE or MODIFY activities. For example, when considering CIFS protocol, a logical file WRITE or MODIFY activity may include one or more of WRITE_ANDX (SMBv1), SMB2_WRITE (SMBv2), DELETE (SMB1), SMB_SET_INFO (SMBv2), RENAME (SMBv1), or the like.

As used herein, the term "attack" or "attacks" indicates in a computer and/or computer networks an attempt to destroy, expose, alter, disable, steal, or gain unauthorized use of an asset or resource, e.g., one or more of files, file information, or computing resources. An attack is typically perpetrated by some person or entity with bad intentions, which are sometimes referred to as black hatted attacks. Not all attacks have bad intentions. For example, an organization may perform penetration testing attacks on their own computers and/or computer networks to evaluate their compliance with security policies. Additionally, there are several different types of passive and active attacks, including one or more of Ransomware, man-in-the-middle, worm, Trojan, denial of service, spoofing, ARP (address resolution protocol) poison, Ping flood, Ping of death, Smurf, wiretapping, Port scan, Idle scan, buffer overflow, heap overflow, stack overflow, format string attack, or the like.

The following briefly describes embodiments of the innovations in order to provide a basic understanding of some aspects of the innovations. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to detecting one or more attacks in a network. In one or more of the various embodiments, one or more network monitoring computers (NMCs) may be used to monitor one or more network flows.

In one or more of the various embodiments, if one or more file write operations are detected based on information included in one or more packets of the one or more network flows, further actions may be performed.

In one or more of the various embodiments, one or more detection rules may be executed to analyze one or more portions of the one or more packets to identify file information that is associated with the one or more file write operations.

In one or more of the various embodiments, one or more metrics may be provided based on the one or more detection rules and one or more of the file information, the one or more file write operations, or the like.

In one or more of the various embodiments, if one or more of the one or more metrics exceed one or more threshold values, one or more reports of one or more attacks may be provided.

In one or more of the various embodiments, providing the one or more metrics based on the one or more detection rules and one or more of the file information, the one or more file write operations, or the like may include comparing one or more portions of the file information to information included in one or more blacklists. Also, in some of the various embodiments, providing the one or more metrics based on the one or more detection rules and one or more of the file information, the one or more file write operations, or the like may include, if the comparison results in one or more affirmative results, incrementing one or more of the one or more metrics.

In one or more of the various embodiments, providing the one or more metrics based on the one or more detections rules and one or more of the file information, the one or more file write operations, or the like may include comparing one or more portions of the file information to information included in one or more whitelists. Also, in some of the various embodiments, providing the one or more metrics based on the one or more detections rules and one or more of the file information, the one or more file write operations, or the like may include, if the comparison results in one or more negative results, incrementing one or more of the one or more metrics.

In one or more of the various embodiments, if one or more time windows concludes, one or more activity windows concludes, or the like, one or more of a metric or a plurality of metrics may be reset.

In one or more of the various embodiments, if the one or more of the one or more metrics exceed the one or more threshold values, further actions may be performed. In some of the various embodiments, these further actions may include capturing one or more read packets, such that the one or more read packets may be associated with one or more file read operations. Also, in some embodiments, these further actions may include storing one or more read packet portions of the one or more read packets in one or more memory buffers. Additionally, in one or more embodiments, these further actions may include extracting one or more portions of file data from the one or more stored read packet portions. Further, in some embodiments, these further actions may include providing one or more files based on the one or more extracted portions of file data.

In one or more of the various embodiments, one or more read packets may be captured, such that the one or more read packets may be associated with one or more file read operations. In some of the various embodiments, one or more read packet portions of the one or more read packets may be stored in one or more memory buffers. In some embodiments, if the one or more of the one or more metrics exceed the one or more threshold values, further actions may be performed. In one or more embodiments, these further actions may include extracting one or more portions of file data from the one or more stored read packet portions. Also, in some embodiments, these further actions may include providing one or more files based on the one or more extracted portions of file data.

In one or more of the various embodiments, the file information may include one or more of one or more file names, one or more file locations, one or more file content entropy values, one or more file extensions, or the like.

In one or more of the various embodiments, detecting the one or more file write operations may include comparing one or more other portions of the one or more packets to one or more values associated with one or more network file protocols.

In one or more of the various embodiments, the NMC may be arranged to continuously capture network traffic that may associated with one or more monitored network flows. Accordingly, in some embodiments, the captured network traffic may be stored in a data store.

In one or more of the various embodiments, the attacks may include one or more of Ransomware, man-in-the-middle, worm, Trojan, denial of service, spoofing, ARP (address resolution protocol) poison, Ping flood, Ping of death, Smurf, wiretapping, Port scan, Idle scan, buffer overflow, heap overflow, stack overflow, format string attack, or the like.

Illustrated Operating Environment

FIG. 1 shows components of one embodiment of an environment in which embodiments of the innovations may be practiced. Not all of the components may be required to practice the innovations, and variations in the arrangement and type of the components may be made without departing from the spirit or scope of the innovations. As shown, system 100 of FIG. 1 includes local area networks (LANs)/wide area networks (WANs)—(network) 110, wireless network 108, client computers 102-105, Application Server Computer 116, Application Server Computer 117, Network monitoring computer 118, or the like.

One or more embodiments of client computers 102-105 is described in more detail below in conjunction with FIG. 2. In one embodiment, some of client computers 102-105 may operate over one or more wired or wireless networks, such as networks 108 or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or fewer client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, or the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include one or more other client applications that are configured to receive or send content between another computer. The client application may include a capability to send or receive content or the like. The client application may further provide information that identifies itself, including a type, capability, name, or the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or another device identifier. Such information may be provided in one or more network packets, or the like, sent between other client computers, application server computer 116, application server computer 117, network monitoring computer 118, or other computers.

Client computers 102-105 may further be configured to include a client application that enables an end-user to log into an end-user account that may be managed by another computer, such as application server computer 116, application server computer 117, network monitoring computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, or the like, to network monitoring computer 118. Also, client computers may be arranged to enable users to display reports, interactive user-interfaces, or results provided by network monitoring computer 118.

Wireless network 108 is configured to couple client computers 103-105 and its components with network 110. Wireless network 108 may include any of a variety of wireless sub-networks that may further overlay stand-alone ad-hoc networks, or the like to provide an infrastructure-oriented connection for client computers 103-105. Such sub-networks may include mesh networks, Wireless LAN (WLAN) networks, cellular networks, or the like. In one embodiment, the system may include more than one wireless network.

Wireless network 108 may further include an autonomous system of terminals, gateways, routers, or the like connected by wireless radio links, or the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, or the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), or the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, application server computer 117, network monitoring computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. In an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116 or application server computer 117 is described in more detail below in conjunction with FIG. 3. Briefly, however, application server computer 116-117 includes virtually any network computer capable of hosting applications or providing services in network environment.

One embodiment of network monitoring computer 118 is described in more detail below in conjunction with FIG. 3. Briefly, however, network monitoring computer 118 may include virtually any network computer capable of passively monitoring communication traffic or capturing network packets in a network environment.

Although FIG. 1 illustrates application server computer 116, application server computer 117, and network monitor device 118, each as a single computer, the innovations or embodiments are not so limited. For example, one or more functions of application server computers 116-117, network monitoring computer 118, or the like may be distributed across one or more distinct network computers. Moreover, in one or more embodiments, network monitoring computer 118 may be implemented using a plurality of network computers. Further, in one or more of the various embodiments, application server computers 116-117 or network monitoring computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
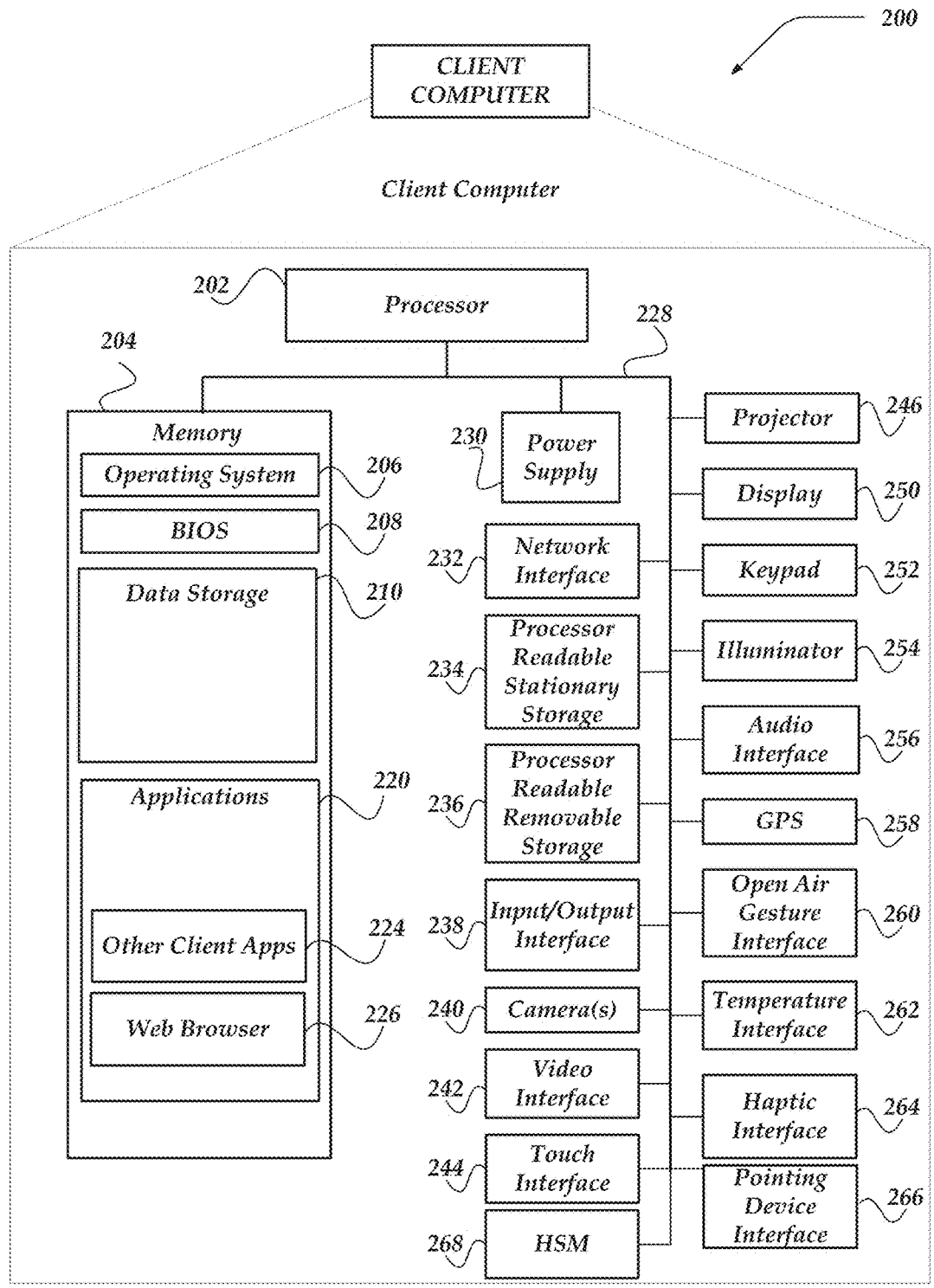
FIG. 2 illustrates a schematic embodiment of an exemplary client computer.

FIG. 2 shows one embodiment of client computer 200 that may include many more or less components than those shown. Client computer 200 may represent, for example, one or more embodiments of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, or the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons in keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing, or using security/cryptographic information such as keys, digital certificates, passwords, passphrases, two-factor authentication information, or the like. In some embodiments, hardware security module may be employed to support one or more standard public key infrastructures (PKI), and may be employed to generate, manage, or store key pairs or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, or the like. Input/output interface 238 can utilize one or more technologies, such as Universal Serial Bus (USB), Infrared, Wi-Fi™, WiMax, Bluetooth™, or the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, or the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, or the like. These peripheral components may communicate over a Pico Network such as Bluetooth™, Zigbee™, or the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, or the like. The client computer's browser application may employ virtually any programming language, including a wireless application protocol messages (WAP), or the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, or the like for use by a processor, such as processor 202 to execute and perform actions. In one embodiment, one or more portions of data storage 210 might also be stored in another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as queries, searches, messages, notification messages, event messages, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of one or more CPUs, such as an Application Specific Integrated Circuits (ASICs), Field Programmable Gate Arrays (FPGAs), Programmable Array Logics (PALs), or the like, or combination thereof. The one or more embedded logic hardware devices may directly execute embedded logic to perform actions. Also, in one or more embodiments (not shown in the figures), client computer 200 may include one or more hardware microcontrollers instead of one or more CPUs. In one or more embodiments, the one or more microcontrollers may directly execute their own embedded logic to perform actions and access its own internal memory and its own external Input and Output Interfaces (e.g., hardware pins or wireless transceivers) to perform actions as a System On a Chip (SOC), or the like.

Illustrative Network Computer

Figure 3:
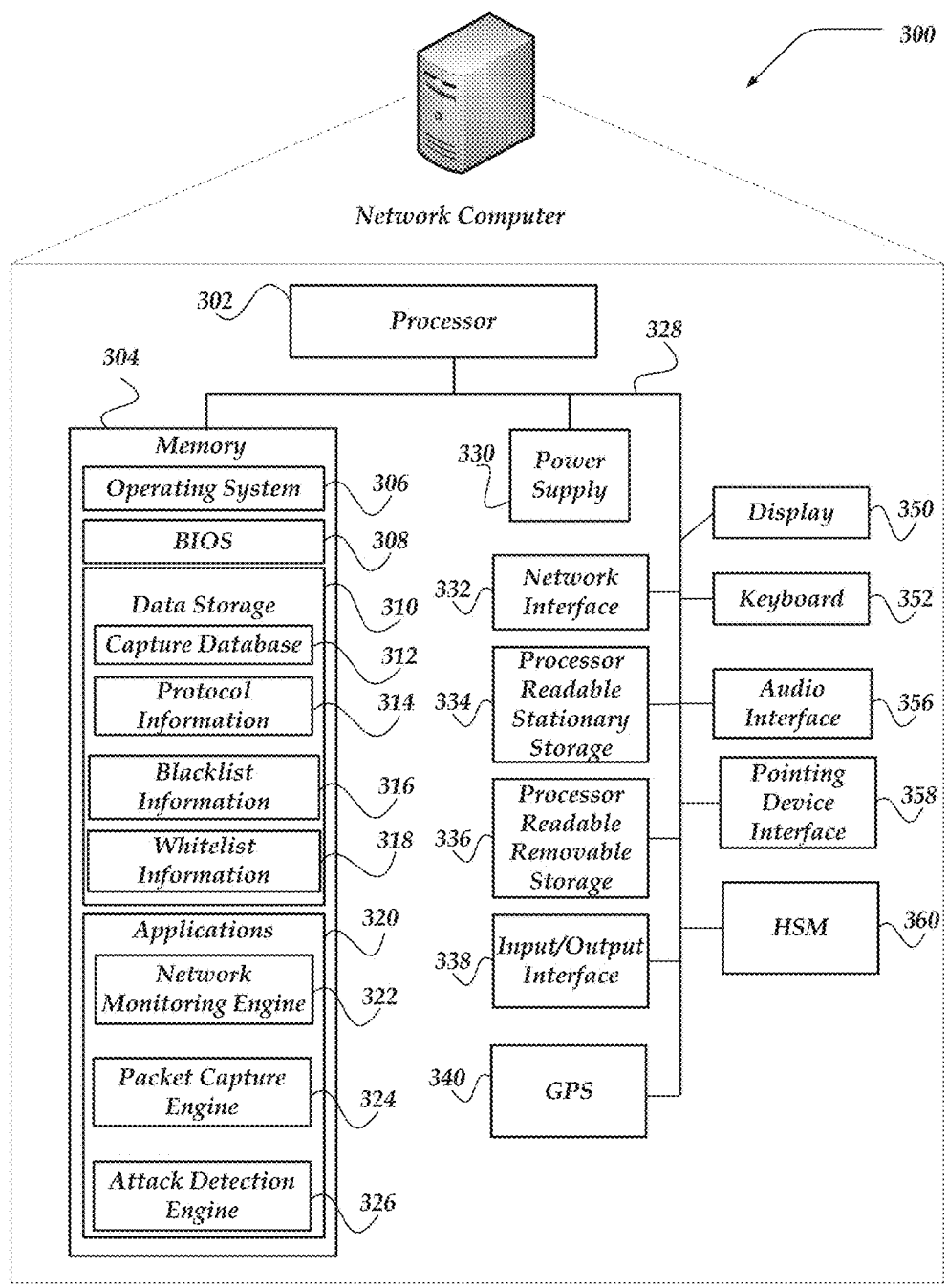
FIG. 3 shows a schematic embodiment of an exemplary network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of one or more of application server computers 116-117 or network monitoring computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, Wi-Fi™, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere in the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, one or more portions of data storage 310 might also be stored in another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, capture database 312, protocol information 314, blacklist information 316, whitelist information 318, or the like.

Capture database 312 may be a data store that contains one or more records, logs, events, network packets, network packet portions, or the like, produced or captured during monitoring of the networks. Protocol information 314 may store various rules or configuration information related to one or more network communication protocols that may be employed, or the like. In one or more of the various embodiments, protocol information 314 may pertain to one or more application-layer network protocols. In some of the various embodiments, protocol information 314 may pertain to one or more protocols used for providing shared access to one or more of files, devices, ports, or the like between nodes of a network. In some embodiments, protocol information 314 may pertain to one or more file-sharing protocols used to provide access to files in a network-attached storage (NAS) server. For example, protocol information 314 may pertain to one or more of Server Message Block (SMB) protocol, one or more dialects of SMB protocol such as CIFS protocol, Network File System (NFS) protocol, Apple Filing Protocol (AFP), or the like.

Blacklist information 316 may store one or more various rules, pieces of configuration information, pattern information (e.g., regular expressions), or the like that may be used to identify one or more files that may be related to one or more attacks. In one or more of the various embodiments, blacklist information 316 may represent one or more databases that store one or more filenames or filename patterns associated with one or more attacks. For example, some attacks may be recognized because they produce encrypted files with names such as "darkness$," "pizzacrypt," "cryptendblackdc," or the like. Also, in some embodiments, attacks may be recognized based on one or more ransom notes with one or more filenames such as "buyunlockcode," "cryptinfo," decrypt_readme," or the like that may be produced and stored with the encrypted files. Further, in some embodiments, attacks may be recognized by identifying file extensions that are known to be associated with one or more known variants of one or more attacks. For example, in some cases, files produced by attacks, such as ransomware attacks may have particular file extensions such as ".locky," "._crypt," ".bleepyourfiles," ".odin," or the like. Also, in some embodiments, blacklist information 316 may be subscription modified (e.g., via one or more automatic updates, semi-automatic updates, or the like) via one or more of pushes, pulls, or the like to include one or more of filenames, file extensions, regular expressions, soundex codes, or the like, that may be associated with one or more recently-known variants of one or more attacks (e.g., one or more variants that have surfaced subsequent to a prior update to blacklist information 316).

Additionally or alternatively, whitelist information 318 may store one or more various rules, pieces of configuration information, pattern information (e.g., regular expressions), or the like, related to one or more files or file locations that may be assumed to be unassociated with attacks. For example, files such as temporary files, log files, print spool files, or the like, may be considered safe in embodiments. Likewise, for example certain file extensions may indicate one or more safe files such as ".asp," ".avhd," ".html," ".png," ".txt," ".url," or the like. Also, in some embodiments, whitelist information 318 may be user modified to include one or more application-specific extensions, customer-specific extensions, custom regular expressions, or the like. As another example, whitelist information 318 may be service modified by an engine that crawls one or more portions of one or more networks (e.g., network-attached storage) to scrape file extensions, present the scraped file extensions to one or more IT administrators, and add the scraped file extensions to whitelist information 318 responsive to IT administrator approval of the scraped file extensions.

In one or more of the various embodiments, whitelist information 318 may store one or more various rules, configuration information, pattern information (e.g., regular expressions), or the like that may be related to one or more portions of one or more networks (e.g., one or more folders, directories, or the like). For example, the one or more portions of the one or more networks may include one or more log files that have one or more file extensions that match one or more dates in which the one or more log files were created, thereby increasing difficulty of whitelisting the one or more file extensions of the one or more log files. By whitelisting the one or more network portions that include the one or more log files, whitelist information 318 effectively whitelists the one or more file extensions of the one or more log files.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, databases, web services, and so forth. Applications 320 may include one or more of network monitoring engine 322, packet capture engine 324, or attack detection engine 326 that perform actions further described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, one or more of network monitoring engine 322, packet capture engine 324, or attack detection engine 326 may be operative in a cloud-based computing environment. In one or more of the various embodiments, one or more of these applications, and others, that comprise the management platform may be executing within virtual machines or virtual servers that may be managed in a cloud-based based computing environment. In one or more of the various embodiments, in this context one or more of the applications may flow from one physical network computer within the cloud-based environment to another depending on performance and scaling considerations automatically managed by the cloud computing environment. Likewise, in one or more of the various embodiments, virtual machines or virtual servers dedicated to one or more of network monitoring engine 322, packet capture engine 324, or attack detection engine 326 may be provisioned and de-commissioned automatically. Also, in one or more of the various embodiments, one or more of network monitoring engine 322, packet capture engine 324, attack detection engine 326, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as keys, digital certificates, passwords, passphrases, two-factor authentication information, or the like. In some embodiments, hardware security module may be employ to support one or more standard public key infrastructures (PKI), and may be employed to generate, manage, or store key pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of one or more CPUs, such as an Application Specific Integrated Circuits (ASICs), Field Programmable Gate Arrays (FPGAs), Programmable Array Logics (PALs), or the like, or combination thereof. The one or more embedded logic hardware devices may directly execute embedded logic to perform actions. Also, in one or more embodiments (not shown in the figures), network computer 300 may include one or more hardware microcontrollers instead of one or more CPUs. In one or more embodiments, the one or more microcontrollers may directly execute their own embedded logic to perform actions and access its own internal memory and its own external Input and Output Interfaces (e.g., hardware pins or wireless transceivers) to perform actions as a System On a Chip (SOC), or the like.

Illustrative Logical System Architecture

Figure 4:
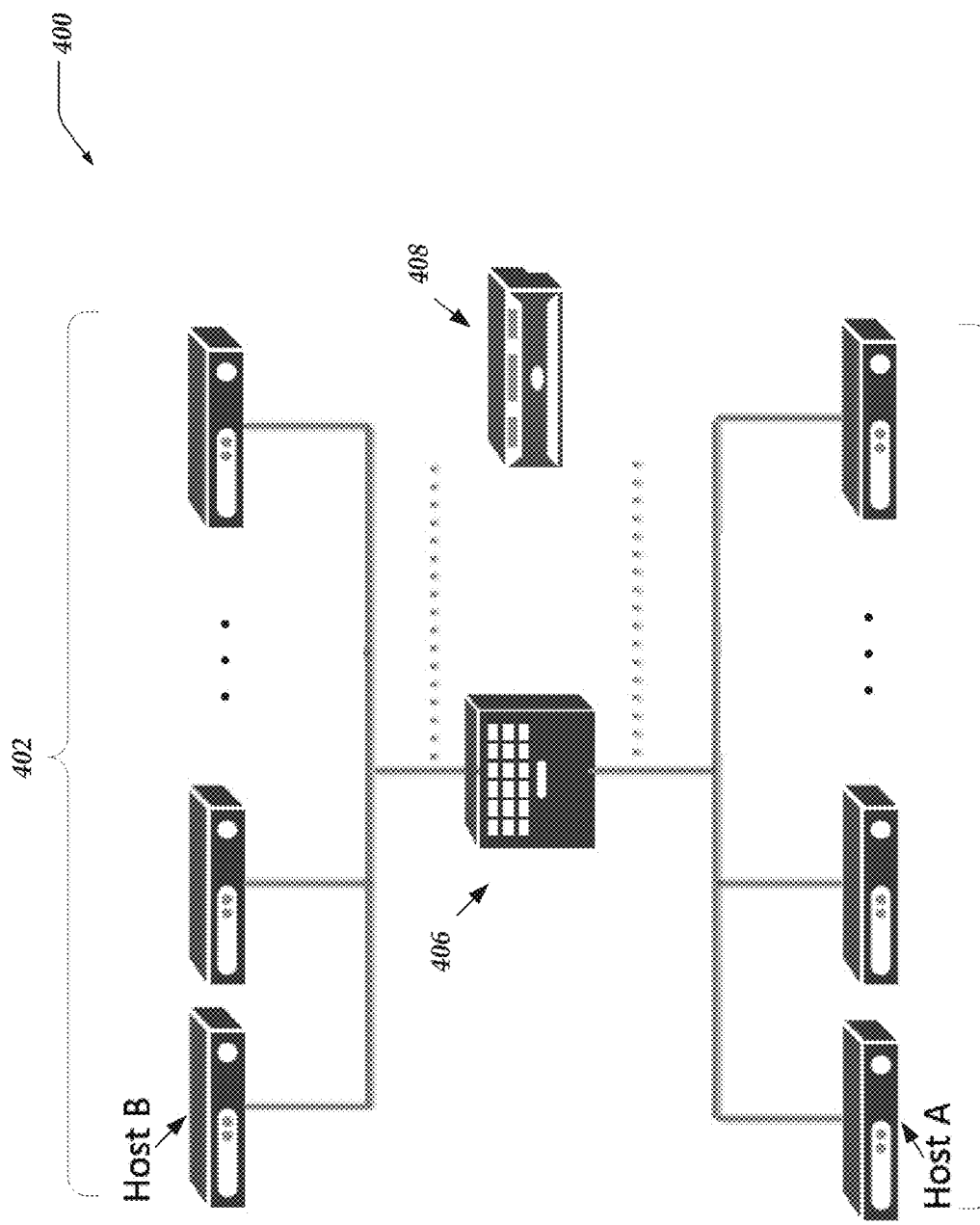
FIG. 4 illustrates a logical architecture of an exemplary system for detecting attacks using passive network monitoring.

FIG. 4 illustrates a logical architecture of exemplary system 400 for capturing exemplary packets. System 400 may be arranged to include a plurality of network devices or network computers in first network 402 and a plurality of network devices or network computers in second network 404. Switch 406 may manage communication between first network 402 and second network 404. Also, NMC 408 may be arranged to passively monitor or capture packets (network packets) communicated in network connection flows between network devices or network computers in first network 402 and second network 404. For example, switch 406 may manage communication of flows of packets between Host B network computer and Host A network computer, and NMC 408 may passively monitor and record some or all of network traffic that comprises these flows.

Also, NMC 408 may be arranged to passively monitor network communication between and among hosts that are in the same network, such as network computers in first network 402.

NMC 408 may be arranged to receive network traffic for monitoring through a variety of means including network taps, wireless receivers, port mirrors or directed tunnels from network switches, clients or servers including endpoints themselves, or other infrastructure devices. In some of the various embodiments, NMC 408 may receive a copy of each packet in a network segment or virtual local area network (VLAN). Also, for some of the various embodiments, NMCs may receive these packet copies through a port mirror in a managed Ethernet switch, e.g., a Switched Port Analyzer (SPAN) port, a Roving Analysis Port (RAP), or the like. Port mirroring may enable analysis and debugging of network communications. Port mirroring can be performed for inbound or outbound traffic (or both) in single or multiple interfaces.

In one or more of the various embodiments, NMC 408 may be arranged to capture data from some or all observed network flows. Additionally or alternatively, NMC 408 may employ one or more buffers (e.g., one or more ring buffers) for packet capturing with regard to one or more flows. Also, NMC 408 may selectively store one or more captured portions of the one or more packets from the ring buffers to one or more packet-capture files, as explained in further detail below.

In some embodiments, the NMC may be arranged to continuously capture network packets that may be associated with one or more monitored network flows. Accordingly, in one or more of the various embodiments, the NMC may be arranged to selectively capture some or all of the network packets that may be monitored or otherwise observed by the NMC. The selection of network packets for capture may be based on the operation of one or more rule-based policies, pattern matches, configuration settings, or the like, or combination thereof.

In one or more of the various embodiments, captured network packets may be stored temporally in ring buffer memories. Also, in one or more of the various embodiments, captured network packets may be stored in persistent data storage, such as disk drives, storage area networks (SANs), solid-state drives, cloud-based storage environments, or the like, or combination thereof.

In one or more of the various embodiments, NMC 408 may be arranged to passively observe both directions of network flows. Accordingly, NMC 408 may be arranged to observe the network conversation between different endpoints in the monitored network. In some embodiments, NMC 408 may be arranged to monitor both directions of a transaction based traffic between endpoints. Accordingly, in one or more of the various embodiments, NMC 408 may be arranged to identify network flows that may be using request/response protocols.

In one or more of the various embodiments, NMC 408 may be arranged to monitor both directions of communication of network flow to determine if a turn has occurred. As defined above, the term "turn" refers to an instant when a network flow changes direction. In some embodiments, NMC 408 may be arranged to observe when servers acknowledge and respond to requests from clients. NMC 408 may be arranged to employ configuration or rules that are used to determine if there is a turn. In some embodiments, NMC 408 may track protocol state information for both ends of a network flow to identify turns. For example, common network protocols, such as TCP have well known transactional behavior that may be observed by NMC 408.

As described above, in one or more of the various embodiments, NMC 408 may be arranged to monitor network flows to observe or record various metrics associated with the flow traffic. In some embodiments, metrics, such as traffic rate, changes in traffic rate, latency, traffic volume, or the like, or combination thereof, may be employed to identify turns. Further, because a given NMC have access to wire traffic, the given NMC has access to the entire OSI layer stack. Accordingly, metrics collected at lower layers may be correlated with information from higher layers to characterize network traffic and identify turns.

Further, in some embodiments, NMC 408 may be arranged to recognize and understand various well-known application level protocols, such as HTTP, SMTP, FTP, DNS, POP3, IMPAP, or the like. Accordingly, in one or more of the various embodiments, NMCs may observe communication between clients and servers and use rules to identify if a turn may be occurring.

Further, in one or more of the various embodiments, NMC 408 may be arranged to discover network applications, such as databases, media servers (e.g., video streaming, music streaming, or the like), video conferencing/chatting, VOIP applications, web servers, or the like. Thus, in some embodiments, NMC 408 may be arranged to monitor traffic of network flows in context of particular applications. Accordingly, in one or more of the various embodiments, NMC 408 may be arranged to employ rules or conditions to identify if a turn occurs based on a contextual understanding of a network application. For example, in some embodiments, a given NMC may be arranged to identify that a network computer (endpoint B) in a network (network B) may be hosting a database application. Accordingly, if the given NMC observes endpoint A sending a database query to endpoint B, endpoint B's response may indicate that a turn has occurred.

In one or more of the various embodiments, NMC 408 may be arranged to employ various conditions, rules, pattern matching, heuristics, or the like, or combination thereof, implemented using scripts, compiled computer languages, ASICs, FGPAs, PALs, or the like, or combination thereof. In some embodiments, NMC 408 may be arranged include one or more conditions, rules, pattern matching, heuristics, or the like, that may be arranged to identify protocols, applications, turns, or the like, for various known network protocols, application protocols, network applications, or the like. Also, in one or more of the various embodiments, NMC 408 may be arranged to enable a user to install additional custom/specialized conditions, rules, pattern matching, heuristics, or the like, to identify other protocols, applications, network applications, turns, and so on.

Figure 5:
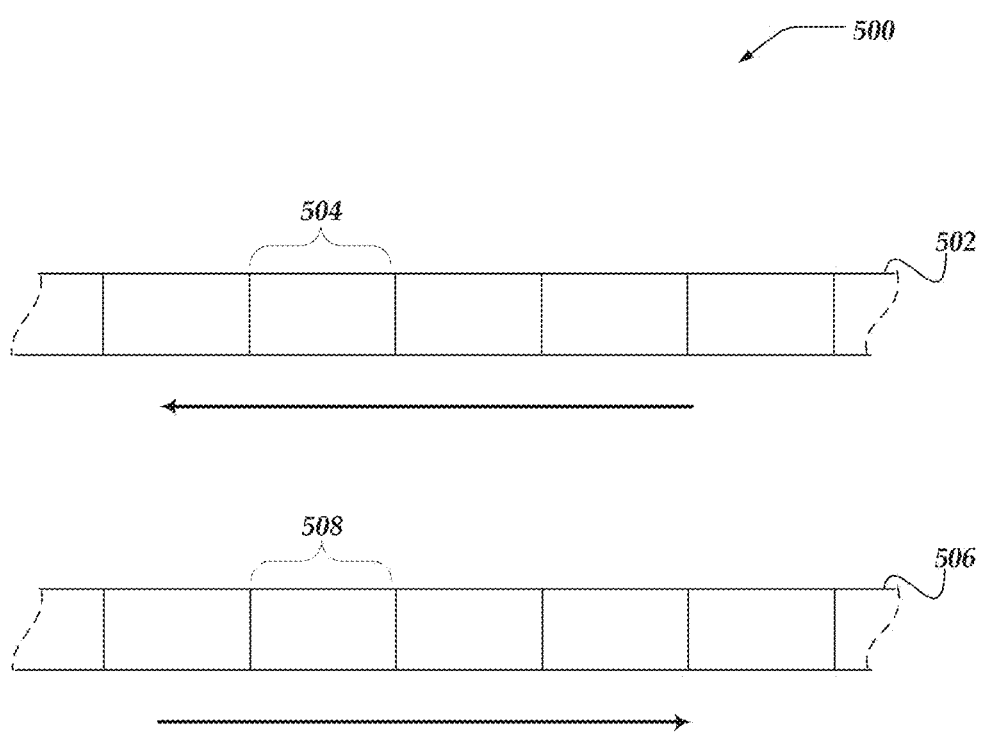
FIG. 5 shows a logical schematic of exemplary streams in an exemplary network flow.

FIG. 5 shows a logical schematic of exemplary streams in an exemplary network flow 500. In one or more of the various embodiments, the network flow 500 may include a first stream 502 that includes one or more packets 504 that one or more network computers (e.g., network computer 300) provide over a network to one or more client computers (e.g., client computer 200). In some of the various embodiments, the first stream 502 may represent a read or download stream. In one or more of the various embodiments, the network flow 500 may also include a second stream 506 that includes one or more packets 508 that the one or more client computers provide over the network to the one or more network computers. In some of the various embodiments, the second stream 506 may represent a write or upload stream.

In one or more of the various embodiments, one or more NMCs (e.g., NMC 408 of FIG. 4) may be disposed to monitor both stream directions in the network flow 500. Also, for this example, the one or more NMCs may be configured to perform network packet capturing in the network. Also, the one or more NMCs may be arranged to capture one or more portions of each network packet where a portion size is defined by a snapshot value.

In one or more of the various embodiments, the one or more NMCs may determine whether the one or more packets 508 in the write or upload stream 506 indicates one or more file write operations (e.g., the one or more client computers write to or modify one or more files in network-attached storage) based on, for example, protocol information (e.g., protocol information 314 of FIG. 3). In some of the various embodiments, the one or more packets 508 in the write or upload stream may represent one or more portions of file information that the one or more client computers encrypts. In some embodiments, the one or more NMCs may detect one or more attacks, including ransomware attacks, based on the one or more packets 508 in the write or upload stream 506 (e.g., as explained in further detail below).

In one or more of the various embodiments, the one or more NMCs may store the one or more packets 504 in the read or download stream 502 that convey one or more portions of file information that the one or more client computers read (e.g., the one or more portions of file information may include one or more portions of file information that the one or more client computers overwrites or modifies). For example, the one or more NMCs may store the one or more packets 504 in one or more capture databases (e.g., capture database 312 of FIG. 3). In some of the various embodiments, the one or more packets 504 in the read or download stream 502 may represent one or more portions of file information that the one or more client computers reads prior to encrypting the one or more portions of file information. In some embodiments, the one or more NMCs may restore one or more files targeted by the one or more attacks (e.g., as explained in further detail below).

Generalized Operations

FIGS. 6-13 represent generalized operations for detecting exemplary attacks. In one or more of the various embodiments, processes 600, 700, 800, 900, 1000, 1100, 1200, and 1300 described in conjunction with FIGS. 6-13 may be implemented by or executed by one or more processors in a single network computer (or network monitoring computer), such as network computer 300 of FIG. 3. In other embodiments, these processes, or portions thereof, may be implemented by or executed in a plurality of network computers, such as network computer 300 of FIG. 3. In yet other embodiments, these processes, or portions thereof, may be implemented by or executed in one or more virtualized computers, such as those in a cloud-based environment. However, embodiments are not so limited and various combinations of network computers, client computers, or the like may be utilized. Further, in one or more of the various embodiments, the processes described in conjunction with FIGS. 6-13 may be used for providing exemplary remedial action. Further, in one or more of the various embodiments, some or all of the actions performed by processes 600, 700, 800, 900, 1000, 1100, 1200, and 1300 may be executed in whole or in part by one or more of network monitoring engine 322, packet capture engine 324, attack detection engine 326, or the like executed by one or more processors of one or more network computers.

Figure 6:
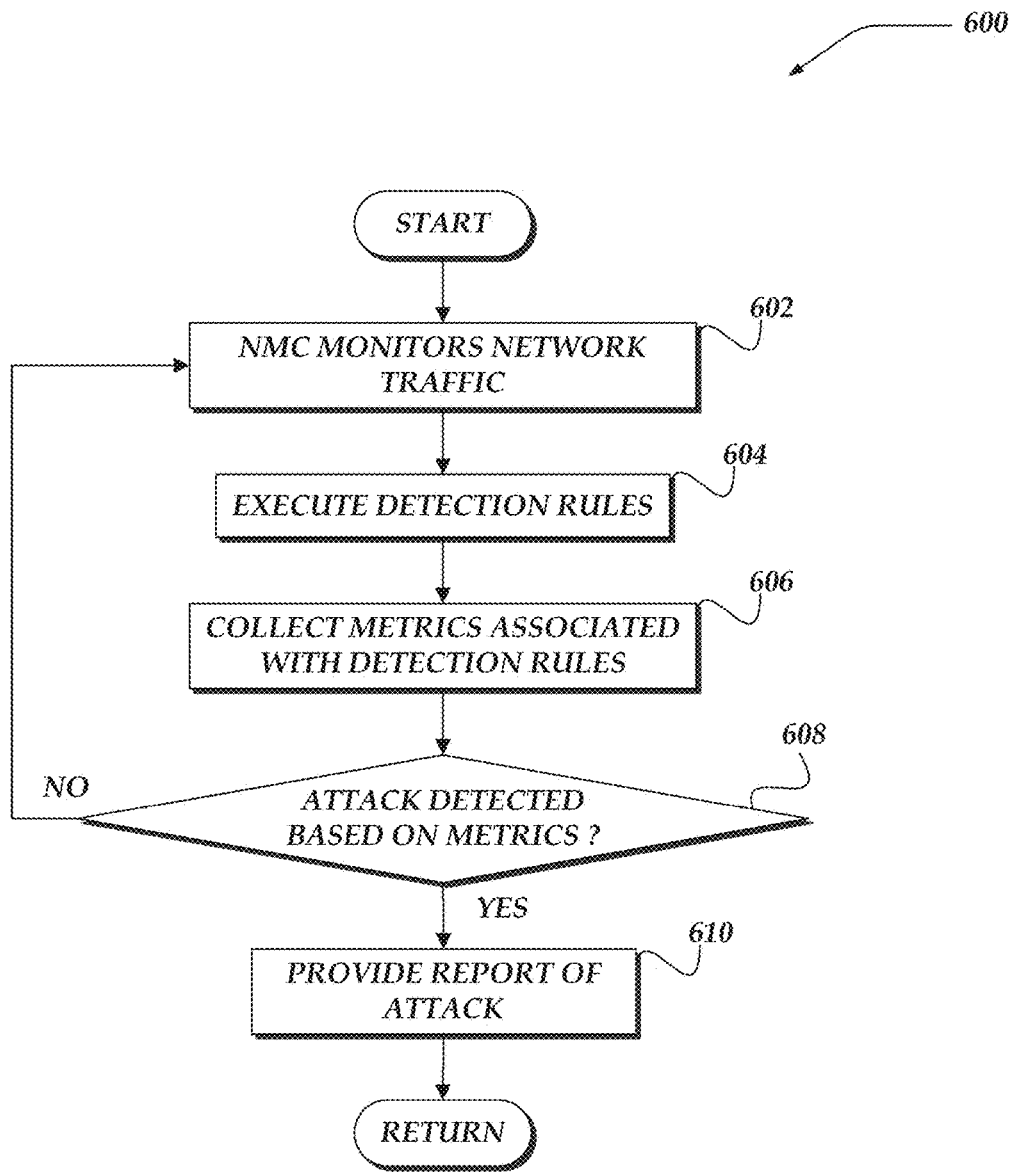
FIG. 6 illustrates an overview flowchart of an exemplary process for detecting exemplary attacks.

FIG. 6 illustrates an overview flowchart of exemplary process 600 for detecting exemplary attacks. After a start block, at block 602, in one or more of the various embodiments, one or more NMCs may be arranged to monitor network traffic in one or more networks. In one or more of the various embodiments, the one or more NMCs may monitor network traffic as explained with regard to one or more portions of one or more of FIG. 4 or FIG. 5. For example, the one or more NMCs may employ one or more packet capture engines (e.g., packet capture engine 324 of FIG. 3) to capture one or more portions of one or more packets in the monitored network traffic. In some of the various embodiments, the one or more packet capture engines may be configured to capture certain one or more portions of one or more types of packets (e.g., packets associated with one or more particular file operations such as, for example, file write operations). In some embodiments, the one or more NMCs may employ one or more network monitoring engines (e.g., network monitoring engine 322 of FIG. 3). In one or more embodiments, the one or more network monitoring engines may be configured to analyze the one or more captured portions of the one or more packets to determine which packet portions to store based on whether the one or more packet portions belong to one or more types of packets (e.g., packets associated with one or more particular file operations such as, for example, file write operations). The one or more NMCs may store the one or more portions of the one or more packets in one or more capture databases (e.g., capture database 312 of FIG. 3). In some embodiments, the NMC may be arranged to continuously capture network packets that may be associated with one or more monitored network flows. Accordingly, in one or more of the various embodiments, the NMC may be arranged to selectively capture some or all of the network packets that may be monitored or otherwise observed by the NMC. The selection of network packets for capture may be based on the operation of one or more rule-based policies, pattern matches, configuration settings, or the like, or combination thereof.

In one or more of the various embodiments, captured network packets may be stored temporally in ring buffer memories. Also, in one or more of the various embodiments, captured network packets may be stored in persistent data storage, such as disk drives, storage area networks (SANs), solid-state drives, cloud-based storage environments, or the like, or combination thereof.

At block 604, in one or more of the various embodiments, the one or more NMCs may execute one or more detection rules. For example, the one or more NMCs may employ one or more attack detection engines (e.g., attack detection engine 326 of FIG. 3) to perform one or more portions of one or more of blocks 604, 606, 608, or 610. In one or more of the various embodiments, the one or more NMCs store one or more portions of the one or more detection rules in, for example, one or more of protocol information 314, blacklist information 316, whitelist information 318, or the like of FIG. 3. In some of the various embodiments, the one or more NMCs may apply the one or more detection rules to one or more portions of the monitored network traffic. In some embodiments, the one or more NMCs may apply the one or more portions of the one or more detection rules as explained with regard to one or more portions of one or more of FIG. 4 or FIG. 5.

At block 606, the one or more NMCs may collect one or more metrics associated with the one or more detection rules. In one or more of the various embodiments, the one or more NMCs may determine the one or more metrics based on one or more results of applying the one or more detection rules to the one or more portions of the monitored network traffic. In some of the various embodiments, the one or more collected metrics may include one or more of array values, counts, measurements, calculations, or the like (e.g., in addition to one or more metrics discussed above). For example, the one or more collected metrics may include one or more arrays of file information (e.g., new or modified filenames, new or modified file extensions, or the like). As another example, the one or more metrics may include one or more counts of occurrences of one or more pieces of file information. As a further example, the one or more metrics may include one or more measurements of elapsed time.

In one or more of the various embodiments, the one or more collected metrics may include one or more entropy measurements (e.g., via heuristics). In some of the various embodiments, the one or more NMCs may measure entropy with regard to one or more flows (e.g., Shannon entropy). In some embodiments, the one or more NMCs may, for one or more flows X, measure entropy of the one or more flows $H(X)$. In one or more embodiments, the one or more NMCs may measure the entropy of the one or more flows $H(X)$ based on information content in the one or more flows $I(X)$ and based on one or more expected value operators $E$. For example, entropy of the one or more flows may be defined as $H(X)=E[I(X)]$. In some embodiments, the one or more expected value operators may represent one or more average values of one or more of one or more standard flows of various customers, one or more flows of one or more specific customers, one or more flows of customers of one or more types that match one or more types of the one or more specific customers, or the like.

In one or more of the various embodiments, the one or more NMCs may measure entropy of data communicated in one or more directions in one or more flows. In some of the various embodiments, the one or more NMCs may compare entropy of data communicated in the one or more directions to entropy of data communicated in one or more other directions. In one or more embodiments, the one or more collected metrics may include one or more differences in entropy as determined by the one or more comparisons. Because encrypted data will likely be highly noisy as compared to normal data, the one or more metrics may indicate a likelihood that data communicated in the one or more directions includes one or more encrypted versions (e.g., when nonencrypted data is communicated in the one or more other directions). Additionally or alternatively, the one or more NMCs may perform one or more other comparisons of entropy of data communicated in the one or more directions to entropy of one or more of standard data of various customers, data of one or more specific customers, data of customers of one or more types that match one or more types of the one or more specific customers, or the like. In some of the various embodiments, the one or more collected metrics may include one or more differences in entropy as determined by the one or more other comparisons.

In one or more of the various embodiments, the one or more NMCs may reset one or more portions of the one or more collected metrics responsive to conclusion of one or more windows (e.g., reset one or more counts to zero, reset one or more arrays to empty, or the like). In some of the various embodiments, the one or more windows may be based on the one or more detection rules. In some embodiments, the one or more NMCs may determine that the one or more windows have concluded based on the one or more measurements of elapsed time exceeding one or more predetermined thresholds. In one or more embodiments, the one or more NMCs may determine that the one or more windows have concluded based on detecting one or more quantities of one or more file operations. In some embodiments, the one or more NMCs may employ one or more windows for each of the one or more metrics. For example, the one or more NMCs may employ, for each of the one or more metrics, one or more of a time-based window, an activity-based window, or the like. In some embodiments, the one or more windows may operate independent of the one or more metrics (e.g., one or more timers continue to count independent of collection of the one or more metrics or changes to the one or more metrics). In one or more embodiments, the one or more windows may extend (e.g., reset one or more timers to zero, increase one or more thresholds, or the like) responsive to collection of the one or more metrics or one or more changes to the one or more metrics (e.g., one or more counts or array lengths increment).

In one or more of the various embodiments, the one or more NMCs may permit adjusting one or more sensitivities based on adjustment of the one or more windows. In some of the various embodiments, extending the one or more windows may increase one or more sensitivities of the one or more NMCs. In some embodiments, shortening the one or more windows may decrease one or more sensitivities of the one or more NMCs. Increasing the one or more sensitivities may increase a likelihood of detecting an attack while also increasing a likelihood of providing a false positive detection. Conversely, decreasing the one or more sensitivities may decrease a likelihood of detecting an attack while also decreasing a likelihood of providing a false positive detection.

In one or more of the various embodiments, the one or more NMCs may track the one or more metrics for one or more portions (e.g., one or more nodes, clients, machines, subnets, or the like as identified by one or more portions of tuple information) of the one or more networks. In some of the various embodiments, the one or more NMCs may separately track the one or more metrics for each of the one or more portions of the one or more networks (e.g., for each client IP address).

At decision block 608, the one or more NMCs may determine whether one or more attacks have been detected based on one or more portions of the one or more collected metrics. In some embodiments, the one or more NMCs may be arranged to detect ransomware attacks. In one or more of the various embodiments, the one or more NMCs may compare the one or more portions of the one or more collected metrics to one or more thresholds. For example, the one or more NMCs may compare one or more counts of total file write operations with regard to one or more filenames or file extensions (e.g., regardless of whether the one or more filenames or file extensions are in one or more whitelists, blacklists, or the like) to the one or more thresholds. As another example, the one or more NMCs may compare one or more counts of total file write operations (e.g., minus file write operations that are associated with copies as determined by, for example, one or more particular patterns of one or more of file read operations or file write operations) to the one or more thresholds. As a further example, the one or more NMCs may compare one or more counts of SMBv1 RENAME (or SMBv2 SMBv2_SET_INFO) methods (or operations) that occur prior to conclusion of one or more corresponding windows to the one or more thresholds. Additionally or alternatively, the one or more NMCs may compare one or more counts of one or more of file read operations or file write operations with regard to unique files that occur for each of one or more portions of one or more networks (e.g., for each of one or more client computers) prior to conclusion of one or more windows to the one or more thresholds. In one or more embodiments, the one or more NMCs may compare one or more counts of complete READ-WRITE pairs that occur prior to conclusion of the one or more windows to the one or more thresholds. As a further example, the one or more NMCs may compare one or more entropy measurements to the one or more thresholds.

In one or more of the various embodiments, the one or more NMCs may calculate one or more scores based on the one or more portions of the one or more collected metrics. In some embodiments, the one or more scores may include one or more of counts or array lengths. In some of the various embodiments, the one or more scores may be based on one or more quantities of the one or more thresholds that have been met or exceeded. In some embodiments, the one or more scores may be based on one or more magnitudes by which the one or more thresholds have been exceeded. In one or more environments, the one or more NMCs may apply different weights to different thresholds in determining the one or more scores. In some embodiments, the one or more NMCs may determine one or more confidence scores based on the one or more portions of the one or more collected metrics. In one or more embodiments, the one or more confidence scores may represent a likelihood that one or more detected attacks are a false-positive. For example, a higher confidence score may indicate a lower likelihood that one or more detected attacks are a false-positive. As another example, a lower confidence score may indicate a higher likelihood that one or more detected attacks are a false-positive.

In one or more of the various embodiments, the one or more NMCs may determine that one or more attacks have been detected responsive to the one or more portions of the one or more collected metrics meeting or exceeding the one or more thresholds. In some of the various embodiments, the one or more NMCs may determine that one or more attacks have been detected responsive to one or more combinations of the one or more portions of the one or more collected metrics meeting or exceeding the one or more thresholds. In one or more embodiments, the one or more NMCs may determine that the one or more attacks have been detected responsive to the one or more scores meeting or exceeding one or more thresholds. In some embodiments, the one or more NMCs may determine that the one or more attacks have been detected responsive to the one or more confidence scores meeting or exceeding one or more thresholds. In one or more embodiments, the one or more NMCs may determine that the one or more attacks have been detected responsive to one or more combinations of the one or more collected metrics, the one or more scores, or the one or more confidence scores meeting or exceeding one or more thresholds. In some embodiments, the one or more NMCs may employ one or more classifier engines to determine whether certain conditions are true and, if enough conditions are true, that one or more attacks have been detected.

In one or more of the various embodiments, the one or more NMCs may permit adjusting one or more sensitivities based on adjustment of one or more thresholds. In some of the various embodiments, the one or more NMCs may, when employing one or more lower thresholds, detect one or more attacks more quickly yet with a higher likelihood of producing a false-positive. For example, the one or more collected metrics may exceed the one or more lower thresholds sooner (e.g., based on fewer observed packets) than if the one or more NMCs employed one or more higher thresholds (e.g., one or more higher thresholds may require one or more higher values of one or more collected metrics, which may not result from lower quantities of observed packets).

In some embodiments, employing one or more higher thresholds may decrease the likelihood of producing false positives at the expense of slower detection of attacks. For example, the one or more higher thresholds may decrease the likelihood of producing false-positives because, in the absence of attacks, the collected metrics may not exceed the one or more higher thresholds (e.g., activities unrelated to attacks may fail to produce metrics that exceed the one or more higher thresholds, yet these metrics might exceed one or more lower thresholds). As another example, the one or more higher thresholds may delay detection because it may be necessary to observe an increased number of packets to collect metrics that have magnitudes that exceed the one or more higher thresholds.

In some of the various embodiments, decreasing the one or more thresholds may increase one or more sensitivities of the one or more NMCs. In one or more embodiments, increasing the one or more thresholds may decrease one or more sensitivities of the one or more NMCs. If no attacks are detected, process 600 may return to block 602 to continue monitoring network traffic. If one or more attacks are detected, process 600 may proceed to block 610.

At block 610, in one or more of the various embodiments, the one or more NMCs may provide one or more reports of the one or more detected attacks. In one or more of the various embodiments, the one or more NMCs may provide the one or more reports to one or more other network computers (e.g., one or more other NMCs), one or more client computers, one or more computer readable mediums, one or more users, or the like. In some of the various embodiments, the one or more reports may include one or more of graphical user interfaces (GUIs), database records, alerts, or the like. In one or more embodiments, the one or more reports may specify the one or more detected attacks. In some embodiments, the one or more reports may specify one or more bases for detecting the one or more detected attacks. In one or more embodiments, the one or more reports may specify one or more computers, flows, or the like that are associated with the one or more detected attacks. For example, the one or more NMCs may include one or more pieces of tuple information (e.g., one or more identifiers of one or more of source, destination, or the like) in the one or more reports (or information derived from the one or more pieces of tuple information).

In one or more of the various embodiments, the one or more NMCs may provide one or more dashboards. In some of the various embodiments, the one or more dashboards may include one or more user-interface controls that display information (e.g., via graphs, charts, tables, or the like). In one or more embodiments, the one or more dashboards may include one or more user-interface controls (e.g., one or more user-interface controls for each of one or more of processes 700 or 800). In some embodiments, the one or more dashboards may display one or more pieces of file information that the one or more NMCs detected in one or more file write operations and that matched one or more elements in the one or more blacklists (e.g., one or more violating or invalid filenames, file extensions, or the like). In one or more embodiments, the one or more dashboards may display one or more pieces of file information that the one or more NMCs detected in one or more file write operations and that matched one or more elements in the one or more whitelists (e.g., one or more safe or valid filenames, file extensions, or the like). In some embodiments, the one or more dashboards may display one or more pieces of file information that the one or more NMCs detected in one or more file write operations and that failed to match one or more elements in either of the one or more blacklists or the one or more whitelists.

In one or more of the various embodiments, the one or more user-interface controls may display one or more pieces of information that are associated with one or more selected IP addresses. For example, the one or more user-interface controls may display one or more bar charts that include a first axis that represents IP addresses, a second axis that represents file extension counts, and each bar that extends from the first axis and parallel to the second axis has one or more magnitudes that indicate one or more quantities of one or more of invalid file extension counts, valid file extension counts, unknown file extension counts, or total file extension counts (e.g., each bar has one or more colors that indicate quantities of one or more of invalid file extension counts, valid file extension counts, or unknown file extension counts). As another example, the one or more user-interface controls may display one or more bar charts that include one or more bars that extend from the first axis, parallel to the second axis, and have one or more colors that indicate quantities of file extension write operations for each invalid file extension that the one or more NMCs detected (e.g., each bar has one or more colors for each detected invalid file extension) (and may do the same for one or more of valid, unknown, or total detected file extensions). In some of the various embodiments, the one or more user-interface controls display one or more pieces of information that are associated with one or more windows (e.g., one or more time windows). For example, the one or more user-interface controls may replace the first axis that represents IP addresses with another first axis that represents time (e.g., each displayed quantity may be associated with a selected IP address or may be a total quantity across multiple selected IP addresses). In some embodiments, the one or more user-interface controls may display one or more pieces of information (e.g., one or more of those pieces of information explained above) via one or more of pie charts, line charts, or the like. In one or more embodiments, the one or more selected IP addresses may include one or more of NMC-selected IP addresses (e.g., each IP address associated with one or more collected metrics) or user-selected IP addresses (e.g., each IP address chosen from one or more NMC-selected IP addresses). In some embodiments, one or more IT administrators may use the one or more dashboards to add to, subtract from, or otherwise modify one or more of blacklists, whitelists, or the like.

Subsequent to block 610, control may be returned to a calling process. In some embodiments, the one or more NMCs may continue operating until a user configures the one or more NMCs to terminate operations.

Figure 7:
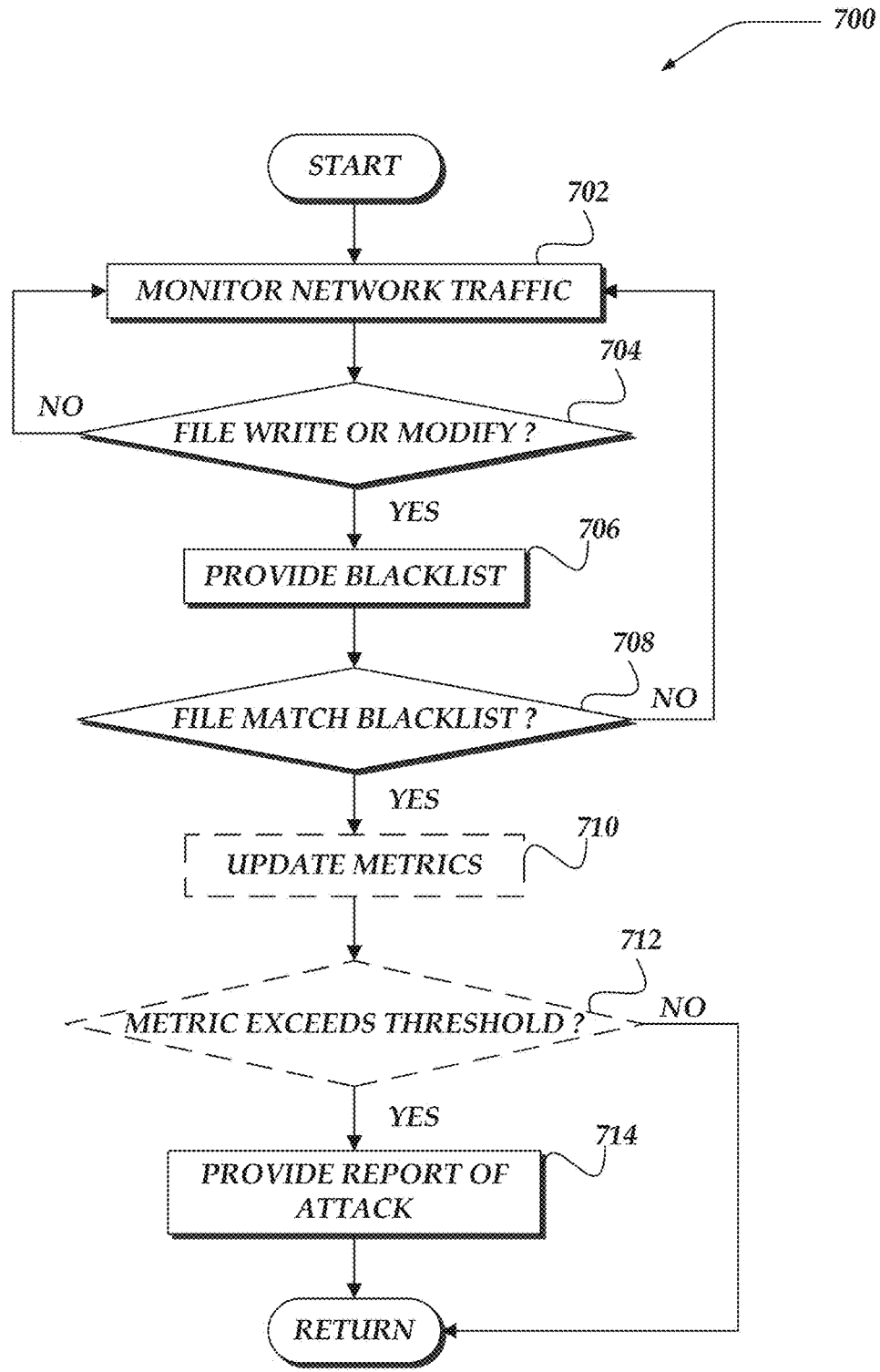
FIG. 7 shows an overview flowchart of an exemplary process for detecting exemplary attacks using one or more exemplary blacklists.

FIG. 7 shows an overview flowchart of exemplary process 700 for detecting exemplary attacks using one or more exemplary blacklists. In one or more of the various embodiments, one or more blocks in process 700 may represent one or more portions of one or more blocks in process 600 of FIG. 6. In some of the various embodiments, one or more NMCs may execute one or more portions of one or more blocks in process 700. For example, the one or more NMCs may be the same as or similar to the one or more NMCs explained with regard to process 600 of FIG. 6.

After a start block, at block 702, in one or more of the various embodiments, the one or more NMCs may passively monitor network traffic. In some embodiments, the NMC may be arranged to continuously capture network packets that may be associated with one or more monitored network flows. Accordingly, in one or more of the various embodiments, the NMC may be arranged to selectively capture some or all of the network packets that may be monitored or otherwise observed by the NMC. The selection of network packets for capture may be based on the operation of one or more rule-based policies, pattern matches, configuration settings, or the like, or combination thereof.

In one or more of the various embodiments, captured network packets may be stored temporally in ring buffer memories. Also, in one or more of the various embodiments, captured network packets may be stored in persistent data storage, such as disk drives, storage area networks (SANs), solid-state drives, cloud-based storage environments, or the like, or combination thereof.

At decision block 704, the one or more NMCs may determine whether the monitored network traffic includes one or more methods (or operations) that result in one or more file write operations (e.g., one or more logical file WRITE or MODIFY activities). In some of the various embodiments, the one or more NMCs may watch for one or more particular types of file write operations (e.g., replacement or modification of one or more filenames, replacement or modification of one or more extensions, or the like). In some embodiments, the one or more NMCs may determine whether the monitored network traffic includes one or more of filename write operations, file extension write operations, or the like. If the one or more NMCs determine that the monitored network traffic fails to include the one or more methods that result in the one or more file write operations, process 700 may return to block 702 to continue monitoring network traffic. If the one or more NMCs determine that the monitored network traffic includes the one or more methods that result in the one or more file write operations, process 700 may continue to block 706.

At block 706, the one or more NMCs may provide one or more blacklists. In one or more of the various embodiments, one or more portions of the one or more blacklists may be provided from blacklist information 316 in FIG. 3. In some of the various embodiments, the one or more blacklists may contain one or more representations of one or more pieces of file information that are known to be malicious. For example, the one or more blacklists may contain one or more representations of one or more filenames that one or more ransomware attacks are known to use as replacement filenames (e.g., when encrypting files). As another example, the one or more blacklists may contain one or more representations of one or more file extensions that one or more attacks such as ransomware attacks are known to use as replacement file extensions (e.g., when encrypting files). As a further example, the one or more blacklists may contain one or more representations of one or more filenames that one or more attacks such as ransomware attacks are known to use for one or more ransom notes. In some embodiments, one or more portions of one or more representations in the one or more blacklists may include one or more of regular expressions, soundex codes, or the like.

At decision block 708, the one or more NMCs may determine whether one or more pieces of file information associated with the one or more files that are a subject of the one or more file write operations match one or more portions of the one or more blacklists. For example, the one or more NMCs may perform pattern matching or recognition, such as pattern matching or recognition based on one or more of regular expressions, soundex codes, or the like in one or more portions of the one or more blacklists. In one or more of the various embodiments, the one or more NMCs may look for exact matches (e.g., pattern matching). In some of the various embodiments, the one or more NMCs may look for near matches (e.g., pattern recognition using regular expressions, wildcard matching, or the like). If the one or more pieces of file information match one or more portions of the one or more blacklists, process 700 may proceed to optional block 710. Block 710 may, however, be optional. For example, responsive to the one or more pieces of file information matching one or more portions of the one or more blacklists that represents one or more pieces of file information indicative of one or more ransom notes, the one or more NMCs may determine that there are no metrics to update. As another example, responsive to detecting one or more ransom notes, the one or more NMCs may determine that there is no need to compare various metrics to various thresholds. Accordingly, because block 710 and block 712 are optional, process 700 may proceed from block 708 directly to block 712 (or block 714). If the one or more pieces of file information fail to match one or more portions of the one or more blacklists, process 700 may return to block 702 to continue monitoring network traffic.

At optional block 710, the one or more NMCs may update one or more metrics. In one or more of the various embodiments, the one or more NMCs may update one or more collected metrics associated with one or more detection rules as explained with regard to process 600 of FIG. 6. In some of the various embodiments, the one or more NMCs may increment (or decrement) one or more counts associated with one or more pieces of information represented in the one or more blacklists. For example, the one or more NMCs may increment one or more counts associated with one or more filenames represented in the one or more blacklists responsive to the one or more NMCs determining that one or more pieces of file information associated with the one or more files that are a subject of the one or more file write operations match one or more portions of the filenames represented in the one or more blacklists. As another example, the one or more NMCs may increment one or more counts associated with one or more file extensions represented in the one or more blacklists responsive to the one or more NMCs determining that one or more pieces of file information associated with the one or more files that are a subject of the one or more file write operations match one or more portions of the file extensions represented in the one or more blacklists. In some of the various embodiments, the one or more NMCs may add the one or more collected metrics to one or more arrays. In some embodiments, the one or more counts may include one or more lengths of the one or more arrays. Process 700 may proceed to block 712. Alternatively, because block 712 is optional, process 700 may proceed from block 710 directly to block 714.

At optional decision block 712, the one or more NMCs may determine whether one or more portions of the one or more updated metrics meet or exceed one or more metric thresholds. In one or more of the various embodiments, the one or more NMCs may employ one or more windows as explained with regard to block 608 of process 600 of FIG. 6. In some of the various embodiments, the one or more NMCs may employ one or more window thresholds of one or more of 60 seconds, 120 seconds, 180 seconds, or the like. In some embodiments, the one or more NMCs may employ one or more window thresholds of one or more of 15 file operations, 30 file operations, 45 file operations, or the like. In one or more of the various embodiments, the one or more NMCs may determine whether one or more combinations of the one or more portions of the one or more updated metrics meet or exceed the one or more metric thresholds. For example, the one or more NMCs may employ one or more metric thresholds of one or more of 5 counts, 10 counts, 15 counts, or the like. In some of the embodiments, the one or more NMCs may calculate one or more confidence scores based on the one or more portions of the one or more updated metrics. In some embodiments, the one or more NMCs may determine whether one or more portions of the one or more scores meet or exceed one or more other thresholds. In some embodiments, the one or more NMCs may determine the one or more confidence scores based on the one or more portions of the one or more updated metrics. If one or more metric thresholds fail to be met or exceeded prior to conclusion of the one or more windows, process 700 may return to a calling process. If the one or more metric thresholds are met or exceeded prior to conclusion of the one or more windows, process 700 may continue to block 714.

At block 714, the one or more NMCs may provide one or more reports of one or more attacks. In one or more of the various embodiments, the one or more NMCs may provide the one or more reports as explained with regard to block 610 in process 600 of FIG. 6.

Subsequent to block 714, control may be returned to a calling process. In some embodiments, the one or more NMCs may continue operating until a user configures the one or more NMCs to terminate operations.

Figure 8:
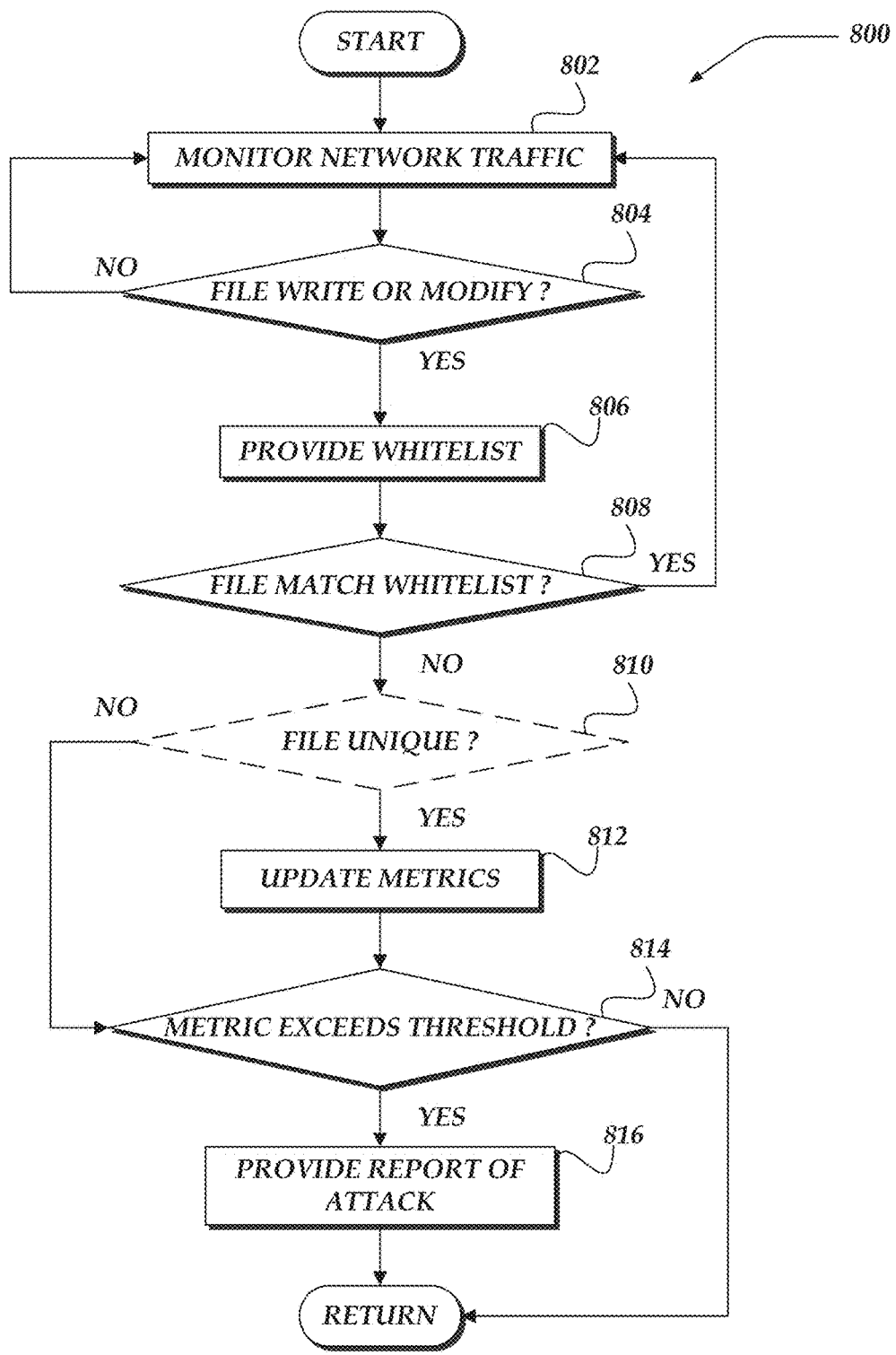
FIG. 8 illustrates an overview flowchart of an exemplary process for detecting attacks using one or more whitelists.

FIG. 8 illustrates an overview flowchart of exemplary process 800 for detecting exemplary attacks using one or more exemplary whitelists. In one or more of the various embodiments, one or more blocks in process 800 may represent one or more portions of one or more blocks in process 600 of FIG. 6. In some of the various embodiments, one or more NMCs may execute one or more portions of one or more blocks in process 800. For example, the one or more NMCs may be the same as or similar to the one or more NMCs explained with regard to process 600 of FIG. 6.

After a start block, at block 802, in one or more of the various embodiments, the one or more NMCs may monitor network traffic. In some embodiments, the NMC may be arranged to continuously capture network packets that may be associated with one or more monitored network flows. Accordingly, in one or more of the various embodiments, the NMC may be arranged to selectively capture some or all of the network packets that may be monitored or otherwise observed by the NMC. The selection of network packets for capture may be based on the operation of one or more rule-based policies, pattern matches, configuration settings, or the like, or combination thereof.

In one or more of the various embodiments, captured network packets may be stored temporally in ring buffer memories. Also, in one or more of the various embodiments, captured network packets may be stored in persistent data storage, such as disk drives, storage area networks (SANs), solid-state drives, cloud-based storage environments, or the like, or combination thereof.

At decision block 804, the one or more NMCs may determine whether the monitored network traffic includes one or more methods (or operations) that result in one or more file write operations. In some of the various embodiments, the one or more NMCs may watch for one or more particular types of one or more file write operations. In some embodiments, the one or more NMCs may determine whether the monitored network traffic includes one or more of filename write operations, file extension write operations, or the like. If the one or more NMCs determine that the monitored network traffic fails to include the one or more methods that result in the one or more file write operations, process 800 may return to block 802 to continue monitoring network traffic. If the one or more NMCs determine that the monitored network traffic includes the one or more methods that result in the one or more file write operations, process 800 may continue to block 806.

At block 806, the one or more NMCs may provide one or more whitelists. In one or more of the various embodiments, one or more portions of the one or more whitelists may be provided from whitelist information 318 in FIG. 3. In some of the various embodiments, the one or more whitelists may contain one or more representations of one or more pieces of file information that are known to be safe. For example, the one or more whitelists may contain one or more representations of one or more filenames of one or more files that one or more uninfected client computers, network computers, or the like store, utilize, or the like. As another example, the one or more whitelists may contain one or more representations of one or more file extensions of one or more files that one or more uninfected client computers, network computers, or the like store, utilize, or the like. In some embodiments, one or more representations in the one or more whitelists may include one or more of regular expressions, soundex codes, or the like.

At decision block 808, the one or more NMCs may determine whether one or more pieces of file information associated with the one or more files that are a subject of the one or more file write operations match one or more portions of the one or more whitelists. For example, the one or more NMCs may perform pattern matching or recognition, such as pattern matching or recognition based on regular expressions, soundex codes, or the like in one or more portions of the one or more whitelists. In one or more of the various embodiments, the one or more NMCs may look for exact matches. In some of the various embodiments, the one or more NMCs may look for near matches (e.g., pattern recognition using regular expressions, wildcard matching, or the like). If the one or more pieces of file information fail to match one or more portions of the one or more whitelists, process 800 may proceed to optional block 810. Block 810 may, however, be optional. For example, the one or more NMCs may track each piece of file information that fails to match the one or more portions of the one or more whitelists regardless of whether the piece of file information is unique (e.g., one or more of filenames, file extensions, or the like that one or more attacks such as ransomware attacks may employ yet one or more blacklists may fail to include). Additionally or alternatively, the one or more NMCs may track each piece of file information that fails to match the one or more portions of the one or more whitelists that are unique (e.g., one or more of filenames, file extensions, or the like that are random, pseudorandom, or the like). Accordingly, because block 810 is optional, process 800 may proceed from block 808 directly to block 812. If the one or more pieces of file information match one or more portions of the one or more whitelists, process 800 may return to block 802 to continue monitoring network traffic 802.

At optional block 810, the one or more NMCs may determine whether the one or more pieces of file information are unique. In one or more of the various embodiments, the one or more NMCs may compare one or more pieces of file information associated with the one or more files that are a subject of the one or more file write operations to one or more portions of one or more collected metrics (e.g., one or more collected metrics associated with one or more detection rules as explained with regard to process 600 of FIG. 6). For example, the one or more collected metrics may include one or more arrays of one or more pieces of file information that fails to match one or more portions of the one or more whitelists (e.g., file information associated with one or more files that are a subject of one or more file write operations that the one or more NMCs detected prior to conclusion of one or more corresponding windows and that fail to match one or more portions of the one or more whitelists). If the one or more pieces of file information are unique (e.g., as compared to each other piece of file information in the one or more arrays), process 800 may proceed to block 812. If the one or more pieces of file information are not unique, process 800 may proceed to decision block 814. Alternatively, if the one or more pieces of file information are not unique, process may proceed to block 812 and, instead, update one or more different portions of one or more metrics (e.g., the one or more NMCs may employ one or more metrics for one or more pieces of file information that are unique and one or more other metrics for one or more pieces of file information that are not unique).

At block 812, the one or more NMCs may update one or more metrics. In one or more of the various embodiments, the one or more NMCs may update one or more portions of one or more of the collected metrics associated with one or more detection rules as explained with regard to process 600 of FIG. 6. In some of the various embodiments, the one or more NMCs may increment (or decrement) one or more counts. In some embodiments, the one or more counts may be associated with one or more compared pieces of information. Additionally or alternatively, the one or more NMCs may add the one or more compared pieces of information to one or more arrays. For example, the one or more NMCs may increment one or more counts (e.g., one or more filename counts) responsive to the one or more NMCs determining that one or more filenames associated with the one or more files that are a subject of the one or more file write operations fail to match one or more portions of the filenames represented in the one or more whitelists. Additionally or alternatively, the one or more NMCs may add the one or more filenames to one or more arrays (e.g., one or more filename arrays). As another example, the one or more NMCs may increment one or more counts (e.g., one or more file-extension counts) responsive to the one or more NMCs determining that one or more file extensions associated with the one or more files that are a subject of the one or more file write operations fail to match one or more portions of the file extensions represented in the one or more whitelists. Additionally or alternatively, the one or more NMCs may add the one or more file extensions to one or more arrays (e.g., one or more file-extension arrays). For example, for a client computer with IP address 192.168.10.1, the one or more NMCs may store an array such as {192.168.10.1, [file1.doc.erd, file2.doc.erd, file3.doc.rtyi, file4.doc.erut, file5.doc.erd, file6.rtyi, file7.doc.uioel]}. In some embodiments, the one or more counts may include one or more lengths of the one or more arrays.

In one or more of the various embodiments, the one or more NMCs may increment (or decrement) one or more counts responsive to the one or more NMCs determining that one or more pieces of file information associated with the one or more files that are a subject of the one or more file write operations are unique (e.g., as compared to each piece of file information considered by the one or more NMCs prior to conclusion of one or more corresponding windows). Additionally or alternatively, the one or more NMCs may add the one or more pieces of file information to one or more arrays. For example, the one or more NMCs may increment one or more counts (e.g., one or more filename counts) responsive to the one or more NMCs determining that one or more filenames associated with the one or more files that are a subject of the one or more file write operations are unique (e.g., as compared to each filename considered by the one or more NMCs prior to conclusion of one or more corresponding windows). As another example, the one or more NMCs may increment one or more counts (e.g., one or more file-extension counts) responsive to the one or more NMCs determining that one or more file extensions associated with the one or more files that are a subject of the one or more file write operations are unique (e.g., as compared to each filename considered by the one or more NMCs prior to conclusion of one or more corresponding windows). In the case of the IP address 192.168.10.1, the one or more NMCs may increment a count to four unique file-extensions in the array. Additionally or alternatively, the one or more NMCs may store a file-extension array such as {192.168.10.1, [*.erd, *.rtyi, *erut, *uioel]}.

At decision block 814, the one or more NMCs may determine whether one or more portions of one or more metrics (e.g., one or more of collected metrics or updated metrics) meet or exceed one or more metric thresholds. In one or more of the various embodiments, the one or more NMCs may employ one or more windows as explained with regard to block 608 of process 600 of FIG. 6. In some of the various embodiments, the one or more NMCs may employ one or more window thresholds of one or more of 210 seconds, 420 seconds, 630 seconds, or the like. In some embodiments, the one or more NMCs may employ one or more window thresholds of one or more of 36 file operations, 54 file operations, 100 file operations, 150 file operations, or the like. In one or more of the various embodiments, the one or more NMCs may determine whether one or more combinations of the one or more portions of the one or more metrics meet or exceed the one or more metric thresholds. For example, the one or more NMCs may employ one or more metric thresholds of one or more of 12 counts, 25 counts, 50 counts, 75 counts, or the like. In some of the embodiments, the one or more NMCs may calculate one or more scores based on the one or more portions of the one or more metrics. In some embodiments, the one or more NMCs may determine whether one or more portions of the one or more scores meet or exceed one or more other thresholds. In some embodiments, the one or more NMCs may determine one or more confidence scores based on the one or more portions of the one or more metrics. If one or more metric thresholds fail to be met or exceeded prior to conclusion of the one or more windows, process 800 may return to a calling process. If the one or more metric thresholds are met or exceeded prior to conclusion of the one or more windows, process 800 may continue to block 816.

At block 816, the one or more NMCs may provide one or more reports of one or more attacks. In one or more of the various embodiments, the one or more NMCs may provide the one or more reports as explained with regard to block 610 in process 600 of FIG. 6.

Subsequent to block 816, control may be returned to a calling process. In some embodiments, the one or more NMCs may continue operating until a user configures the one or more NMCs to terminate operations.

Figure 9:
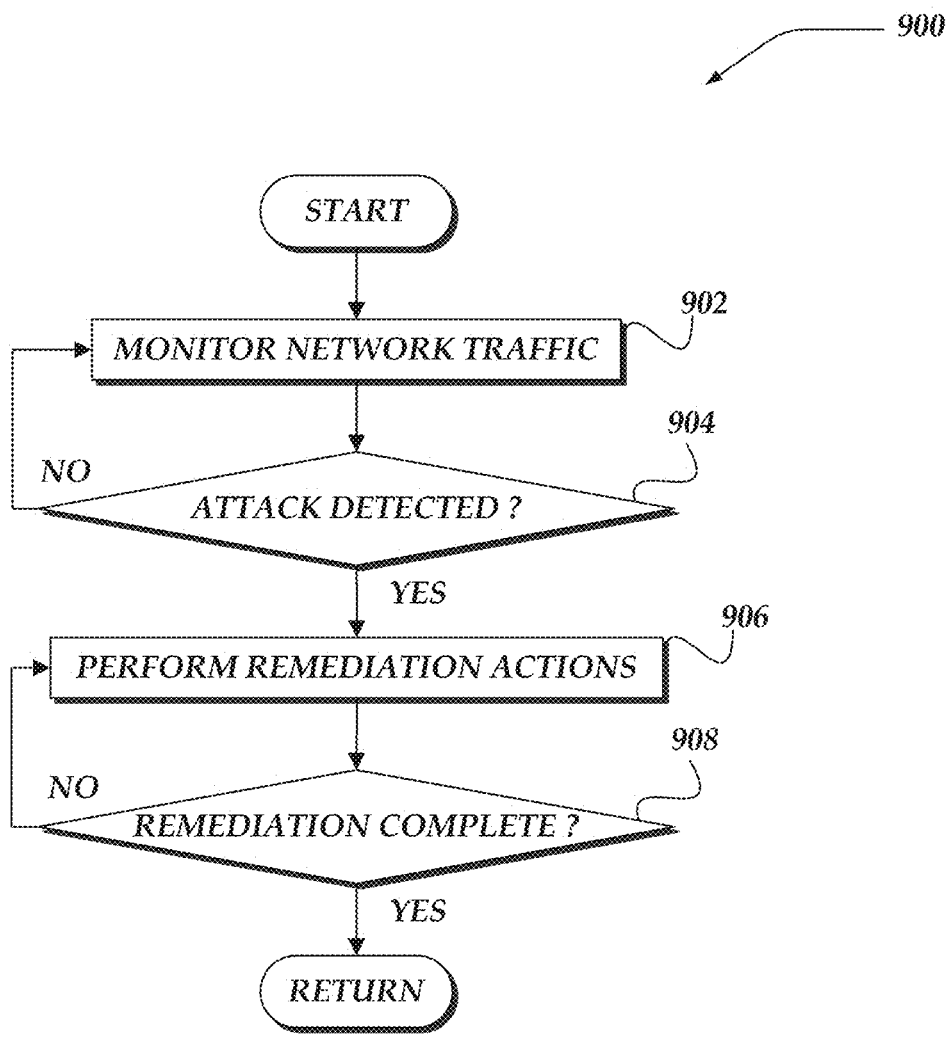
FIG. 9 shows an overview flowchart of an exemplary process for remediating one or more detected attacks.

FIG. 9 shows an overview flowchart of exemplary process 900 for remediating one or more exemplary detected attacks. In one or more of the various embodiments, one or more blocks in process 900 may represent one or more portions of one or more blocks in process 600 of FIG. 6. In some of the various embodiments, one or more NMCs may execute one or more portions of one or more blocks in process 900. For example, the one or more NMCs may be the same as or similar to the one or more NMCs explained with regard to process 600 of FIG. 6.

After a start block, at block 902, in one or more of the various embodiments, the one or more NMCs may monitor network traffic. In some embodiments, the NMC may be arranged to continuously capture network packets that may be associated with one or more monitored network flows. Accordingly, in one or more of the various embodiments, the NMC may be arranged to selectively capture some or all of the network packets that may be monitored or otherwise observed by the NMC. The selection of network packets for capture may be based on the operation of one or more rule-based policies, pattern matches, configuration settings, or the like, or combination thereof.

In one or more of the various embodiments, captured network packets may be stored temporally in ring buffer memories. Also, in one or more of the various embodiments, captured network packets may be stored in persistent data storage, such as disk drives, storage area networks (SANs), solid-state drives, cloud-based storage environments, or the like, or combination thereof.

At decision block 904, the one or more NMCs may determine whether one or more attacks have been detected. In one or more of the various embodiments, the one or more NMCs may detect one or more attacks based on the monitored network traffic (e.g., as explained above). If one or more attacks have not been detected, process 900 may return to block 902 to continue monitoring network traffic. If one or more attacks have been detected, process 900 may proceed to block 906.

At block 906, the one or more NMCs may perform one or more remediation actions. In one or more of the various embodiments, the one or more remediation actions may include restoring one or more portions of one or more files in one or more flows associated with the one or more attacks (e.g., as explained in further detail below). In some embodiments, the one or more remediation actions may include forwarding one or more portions of one or more of captured packets or restored files to one or more analysis centers (e.g., one or more threat research centers, one or more IT administrators, or the like). In some of the various embodiments, the one or more remediation actions may include one or more of quarantining or blocking one or more portions of one or more networks (e.g., one or more nodes, subnets, or the like) associated with the one or more attacks. In some embodiments, the one or more NMCs may logically quarantine or block the one or more associated portions of the one or more networks. In one or more embodiments, the one or more NMCs may quarantine or block each portion of the one or more networks that communicated with the one or more associated portions of the one or more networks (e.g., based on clustering potentially victimized machines that communicated with each other to determine edge or likely edge of attack). In some embodiments, the one or more NMCs may permit one or more IT administrators to adjust aggressiveness of the one or more of quarantining or blocking (e.g., one or more levels of aggression with regard to clustering or edge detection). In one or more embodiments, the one or more NMCs may forward one or more portions of data to one or more threat research centers or the like for analysis and wait for one or more responses prior to employing the one or more of quarantining or blocking.

In one or more of the various embodiments, the one or more NMCs may adjust one or more security rules, policies, boundaries, or the like. For example, the one or more NMCs may implement one or more zero-trust policies that completely lock down communications to or from one or more portions of one or more networks (e.g., one or more nodes, subnets, or the like). In some of the various embodiments, the one or more NMCs may adjust one or more portions of one or more borders of one or more portions (e.g., microsegments, subnets, or the like) of one or more software-defined networks. In some embodiments, the one or more NMCs may adjust one or more parameters of one or more firewalls (e.g., permitted types of methods or operations, forbidden types of methods or operations, whitelisted tuple information, blacklisted tuple information, or the like). In some of the various embodiments, the one or more NMCs may adjust one or more parameters of one or more portions (e.g., segments, subnets, or the like) of one or more physically defined networks. In some embodiments, the one or more NMCs may adjust one or more network access controls (NACs). For example, the one or more NMCs may revoke one or more abilities of one or more portions of one or more networks (e.g., one or more nodes, subnets, or the like) to access one or more other portions of the one or more networks (e.g., one or more other nodes, subnets, or the like). As another example, the one or more NMCs may adjust one or more policies that control access to one or more portions of the one or more networks. In one or more of the various embodiments, the one or more remediation actions may include adjusting one or more sensitivities (e.g., thresholds) in one or more other detection engines or tools. For example, the one or more NMCs may instruct one or more other NMCs to employ more stringent (and possibly more expensive) analysis. As another example, the one or more NMCs may provision (e.g., from one or more pools of previously instantiated virtual machines) or instantiate one or more virtual machines to perform one or more remedial actions. In some embodiments, the one or more NMCs may recommend one or more remedial actions (e.g., based on a lookup table associated with one or more of metrics, metric scores, confidence scores, detected attacks, or the like). In one or more embodiments, the one or more NMCs may employ escalation to increase performance (e.g., at cost of operating expense) responsive to detecting one or more attacks. In some embodiments, the one or more NMCs may permit one or more administrators to enable or disable one or more individual portions of one or more methods or the one or more NMCs.

At decision block 908, the one or more NMCs may determine whether remediation is complete. If remediation is incomplete, process 900 may return to block 906 to continue remediation. If remediation is complete, process 900 may return to a calling process. In some embodiments, the one or more NMCs may continue operating until a user configures the one or more NMCs to terminate operations.

Figure 10:
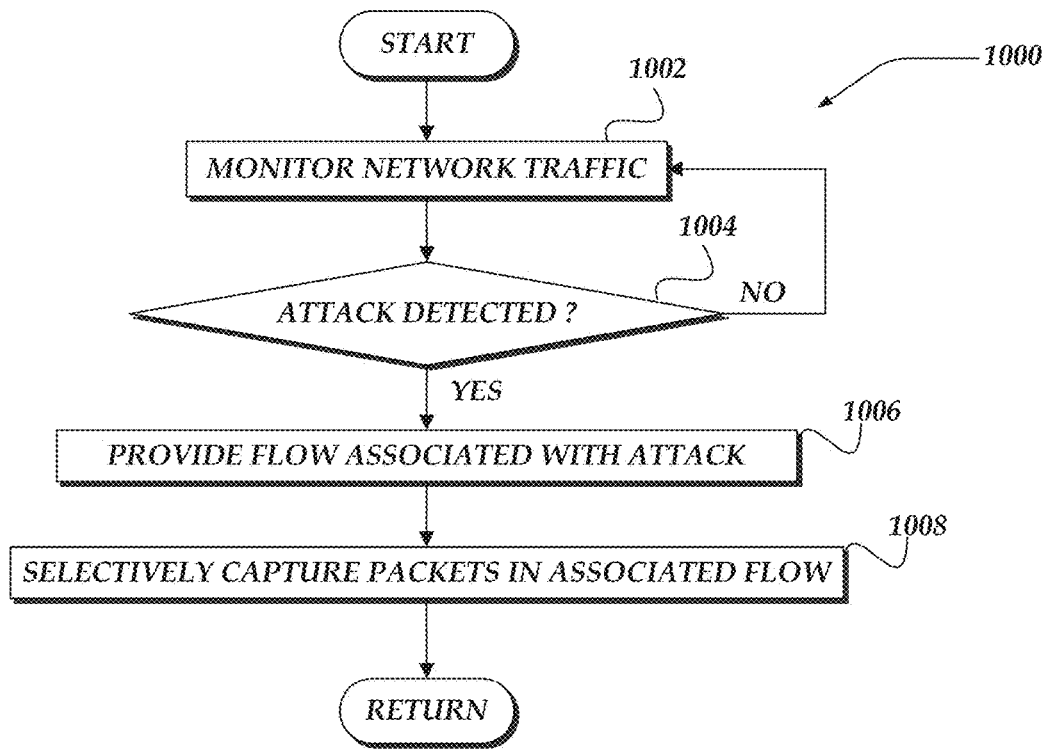
FIG. 10 illustrates an overview flowchart of an exemplary process for selectively capturing packets in one or more exemplary flows associated with one or more detected attacks.

FIG. 10 illustrates an overview flowchart of exemplary process 1000 for selectively capturing exemplary packets in one or more exemplary flows associated with one or more exemplary detected attacks. In one or more of the various embodiments, one or more blocks in process 1000 may represent one or more portions of one or more blocks in process 600 of FIG. 6. In some of the various embodiments, one or more blocks in process 1000 may represent one or more portions of one or more blocks in process 900 of FIG. 9. In some embodiments, one or more NMCs may execute one or more portions of one or more blocks in process 1000. For example, the one or more NMCs may be the same as or similar to the one or more NMCs explained with regard to process 600 of FIG. 6.

After a start block, at block 1002, in one or more of the various embodiments, the one or more NMCs may monitor network traffic. In some embodiments, the NMC may be arranged to continuously capture network packets that may be associated with one or more monitored network flows. Accordingly, in one or more of the various embodiments, the NMC may be arranged to selectively capture some or all of the network packets that may be monitored or otherwise observed by the NMC. The selection of network packets for capture may be based on the operation of one or more rule-based policies, pattern matches, configuration settings, or the like, or combination thereof.

In one or more of the various embodiments, captured network packets may be stored temporally in ring buffer memories. Also, in one or more of the various embodiments, captured network packets may be stored in persistent data storage, such as disk drives, storage area networks (SANs), solid-state drives, cloud-based storage environments, or the like, or combination thereof.

At decision block 1004, the one or more NMCs may determine whether one or more attacks have been detected. In one or more of the various embodiments, the one or more NMCs may detect one or more attacks based on the monitored network traffic (e.g., as explained above). If one or more attacks have not been detected, process 1000 may return to block 1002 to continue monitoring network traffic. If one or more attacks have been detected, process 1000 may proceed to block 1006.

At block 1006, one or more flows associated with the one or more detected attacks may be provided. In one or more of the various embodiments, the one or more NMCs may associate the one or more flows with the one or more detected attacks based on the monitored network traffic. In some of the various embodiments, the one or more NMCs may associate the one or more flows with the one or more detected attacks based on the one or more flows including one or more pieces of file information that led to one or more metrics exceeding one or more thresholds (e.g., as explained with regard to one or more of processes 600, 700, or 800). In some embodiments, the one or more NMCs may associate the one or more flows with the one or more detected attacks based on the one or more flows including one or more communications with one or more portions of one or more networks (e.g., one or more nodes, subnets, or the like) that transmitted or received one or more pieces of file information that led to one or more metrics exceeding one or more thresholds.

At block 1008, the one or more NMCs may selectively capture one or more packets in the one or more associated flows. In one or more of the various embodiments, the one or more NMCs may selectively extract one or more captured packets from one or more buffers (e.g., one or more ring buffers) associated with the one or more flows. In some of the various embodiments, the one or more NMCs may selectively extract one or more captured packets from the one or more buffers that were captured within a time window. In some embodiments, the time window may extend back to when the one or more attacks were detected. In one or more embodiments, the time window may extend back to when one or more metrics that eventually led to detection of the one or more attacks were first collected. For example, the time window may extend back to when a count that eventually exceeded a threshold was first incremented (e.g., prior to a reset that immediately-preceded a set of increments that led to exceeding the threshold). As another example, the time window may extend back to when an array that eventually exceeded the threshold first had an element added to the array (e.g., prior to a reset that immediately preceded a set of elements that led to exceeding the threshold). In some embodiments, the time window may extend back to when the oldest captured packet in the one or more buffers was captured.

In one or more of the various embodiments, the one or more NMCs may selectively extract one or more packets based on one or more filters (e.g., applied to one or more portions of one or more flows). For example, the one or more NMCs may selectively capture or extract one or more packets based on one or more entropy measurements (e.g., responsive to one or more measured entropy values meeting or exceeding one or more thresholds, such as, for example, explained in further detail below). As another example, the one or more NMCs may selectively capture or extract one or more packets based on one or more file operation types associated with the one or more packets. In some of the various embodiments, the one or more NMCs may selectively capture or extract the one or more packets responsive to the one or more packets being associated with one or more file read operations. In some embodiments, the one or more NMCs may selectively capture or extract the one or more packets based on one or more portions of one or more networks (e.g., one or more nodes, subnets, or the like) that performed the one or more methods (or operations). For example, the one or more NMCs may capture or extract one or more packets responsive to determining that those one or more packets are part of one or more file operations performed by one or more particular computers (e.g., those one or more packets may be communicated from the one or more particular computers and may include one or more of one or more protocol write or modify methods, one or more portions of information to write to one or more files, or the like). In one or more embodiments, the one or more NMCs may selectively capture or extract the one or more packets based on one or more portions of one or more networks (e.g., one or more nodes, subnets, or the like) that requested the one or more file operations. For example, the one or more NMCs may capture or extract one or more packets responsive to determining that those one or more packets are part of one or more file operations requested by one or more particular computers (e.g., those one or more packets may be communicated to the one or more particular computers and may, in response to one or more file read operations by the one or more particular computers, include one or more portions of information read from one or more files). In some embodiments, the one or more NMCs may selectively capture or extract the one or more packets responsive to determining that the one or more file operations were performed or requested by one or more portions of the one or more networks that transmitted or received one or more pieces of file information that led to one or more metrics exceeding one or more thresholds.

In one or more of the various embodiments, the one or more NMCs may selectively capture or extract the one or more packets based on one or more direction of one or more portions of the one or more associated flows that contains the one or more packets. For example, the one or more NMCs may capture or extract one or more packets responsive to determining that those one or more packets are communicated to one or more particular computers (or from one or more other particular computers). As another example, the one or more NMCs may capture or extract one or more packets responsive to determining that those one or more packets are included in (or otherwise associated with) one or more portions of one or more flows that have one or more measured entropy values that meet or exceed one or more thresholds (e.g., those one or more packets may include one or more of encrypted file information, one or more other indicators of one or more attacks, or the like). In some of the various embodiments, the one or more NMCs may selectively capture or extract the one or more packets based on one or more other packets in one or more other directions of one or more other portions of the one or more associated flows. For example, the one or more NMCs may capture or extract one or more packets communicated to one or more particular computers responsive to determining that the one or more particular computers communicated one or more protocol read methods (e.g., those one or more packets may include one or more portions of information read from one or more files specified by the one or more protocol read methods). As another example, the one or more NMCs may capture or extract one or more packets responsive to determining that those one or more packets are communicated in a direction that opposes a direction of one or more portions of one or more flows that have one or more measured entropy values that meet or exceed one or more thresholds (e.g., those one or more packets may include one or more portions of unencrypted file information that is encrypted in the one or more portions in the opposing direction). In one or more embodiments, the one or more NMCs may selectively capture or extract the one or more packets responsive to determining that the one or more packets are associated with one or more files with which the one or more other packets are also associated. In some embodiments, the one or more NMCs may selectively capture or extract the one or more packets based on one or more method (or operation) types associated with the one or more other packets. For example, the one or more NMCs may selectively capture or extract the one or more packets responsive to determining that the one or more other packets are associated with one or more file write operations. In one or more of the various embodiments, the one or more NMCs may selectively capture or extract the one or more packets responsive to determining that the one or more packets are associated with one or more file read operations and that the one or more other packets are associated with one or more file write operations. For example, the one or more packets may include one or more portions of file information that one or more endpoints that receive the one or more packets may encrypt, and the one or more other packets may include one or more portions of the encrypted file information that the one or more endpoints writes (e.g., writes over the file information that the one or more endpoints receive).

In one or more of the various embodiments, the one or more NMCs may selectively capture or extract one or more portions of one or more payloads of the one or more packets. For example, the one or more NMCs may selectively capture or extract one or more packet capture samples of the one or more packets. In some of the various embodiments, the one or more NMCs may store the one or more selectively captured or extracted portions in one or more storage files. For example, the one or more NMCs may store the one or more packet capture samples in one or more captured-packet files. In some embodiments, the one or more NMCs may record all underlying packet data (e.g., via a precision deep packet capture). In one or more of the various embodiments, the one or more NMCs may perform one or more portions of one or more of blocks 1006 or 1008 with regard to the one or more other packets. For example, the one or more NMCs may one or more of capture, extract, or store one or more portions of the one or more other packets.

In one or more of the various embodiments, the one or more NMCs may permit one or more IT administrators to analyze the selectively captured or extracted packets to view historical file operations of one or more machines associated with the one or more flows (e.g., during a particular time period that led up to when an attack started) to determine a source of the one or more attacks (e.g., a PDF, executable file, a URL that a user clicked, or the like). In some of the various embodiments, the one or more NMCs may provide one or more logs of file operations that occurred within one or more windows (e.g., as defined by one or more time periods, one or more file operations, or the like) prior to detection of the one or more attacks. In some embodiments, the one or more NMCs may provide one or more suggestions to one or more forensic analysts with regard to one or more potential windows within which the one or more attacks likely began (e.g., based on the one or more metrics).

Subsequent to block 1008, process 1000 may return to a calling process. In some embodiments, the one or more NMCs may continue operating until a user configures the one or more NMCs to terminate operations.

Figure 11:
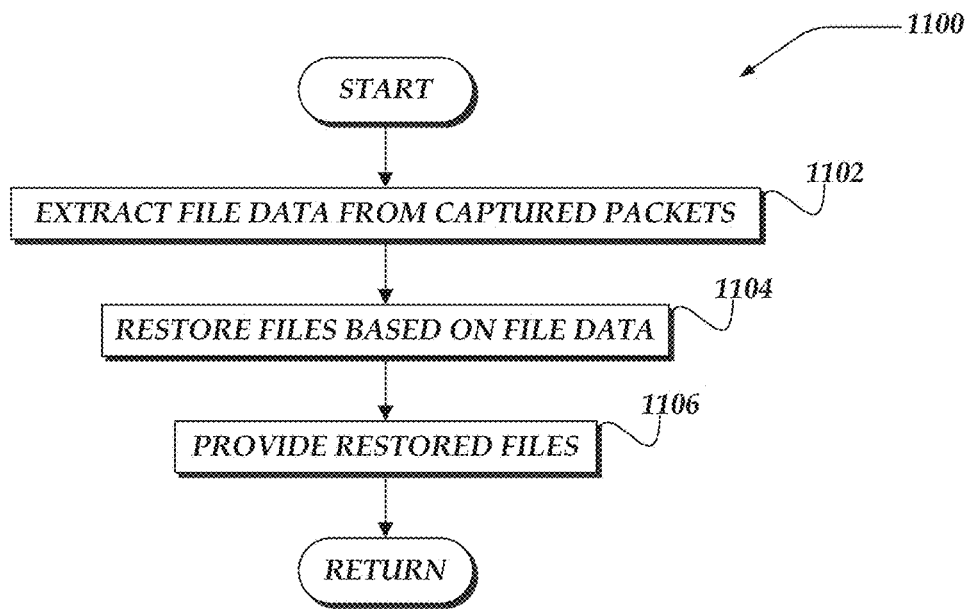
FIG. 11 shows an overview flowchart of an exemplary process for restoring files based on exemplary file data extracted from captured packets.

FIG. 11 shows an overview flowchart of exemplary process 1100 for restoring exemplary files based on exemplary file data extracted from exemplary captured packets. In one or more of the various embodiments, one or more blocks in process 1100 may represent one or more portions of one or more blocks in process 600 of FIG. 6. In some of the various embodiments, one or more blocks in process 1100 may represent one or more portions of one or more blocks in process 900 of FIG. 9. In some embodiments, one or more NMCs may execute one or more portions of one or more blocks in process 1100. For example, the one or more NMCs may be the same as or similar to the one or more NMCs explained with regard to process 600 of FIG. 6.

After a start block, at block 1102, in one or more of the various embodiments, the one or more NMCs may extract one or more portions of file data from one or more captured packets. In one or more of the various embodiments, the one or more captured packets may be the one or more packets selectively captured or extracted in process 1000 of FIG. 10. In some embodiments, the captured packets may be some or all of the network packets captured by an NMC that may be configured to perform continuous network packet capture of one or more network flows. In some of the various embodiments, the one or more portions of file data may include one or more portions of one or more bodies of the one or more captured packets. In some embodiments, the one or more NMCs may extract one or more portions of one or more headers of the one or more captured packets. In one or more embodiments, the one or more NMCs may extract one or more portions of the one or more captured packets that indicate a location of the one or more portions of file data in one or more files. In some embodiments, the one or more NMCs may extract one or more portions of one or more file headers from the one or more captured packets. In one or more embodiments, the one or more NMCs may extract one or more portions of one or more file footers from the one or more captured packets.

In one or more of the various embodiments, the one or more NMCs may extract portions of the one or more files directly from one or more storage files that contain captured packets (e.g., one or more PCAP files or the like) or directly from the storage device used to store the storage files. In some of the various embodiments, the one or more NMCs may extract the portions via one or more forensic processes (e.g., carving such as one or more of file carving, data carving, or the like).

At block 1104, the one or more NMCs may restore one or more files based on the file data. In one or more of the various embodiments, the one or more NMCs may reconstruct the one or more files based on the file data (e.g., via one or more protocol analyzers).

At block 1106, the one or more NMCs may provide the one or more restored files. In one or more of the various embodiments, the one or more NMCs export the one or more restored files. In some of the various embodiments, the one or more NMCs may store the one or more files to one or more protected locations (e.g., one or more memories that are isolated from one or more portions of one or more networks (e.g., one or more nodes, subnets, or the like) that may be compromised of or exposed to one or more detected attacks).

In one or more of the various embodiments, the one or more NMCs may perform one or more portions of one or more of blocks 1102, 1104, or 1106 with regard to one or more other packets, such as the one or more other packets captured, extracted, or stored in process 1000 of FIG. 10. For example, the one or more NMCs may provide the one or more restored files (e.g., one or more original files) that were restored from the one or more packets and may also provide one or more other restored files (e.g., one or more encrypted files that overwrite, replace, or the like one or more portions of the one or more original unencrypted files) that were restored from the one or more other packets.

Subsequent to block 1106, process 1100 may return to a calling process. In some embodiments, the one or more NMCs may continue operating until a user configures the one or more NMCs to terminate operations.

Figure 12:
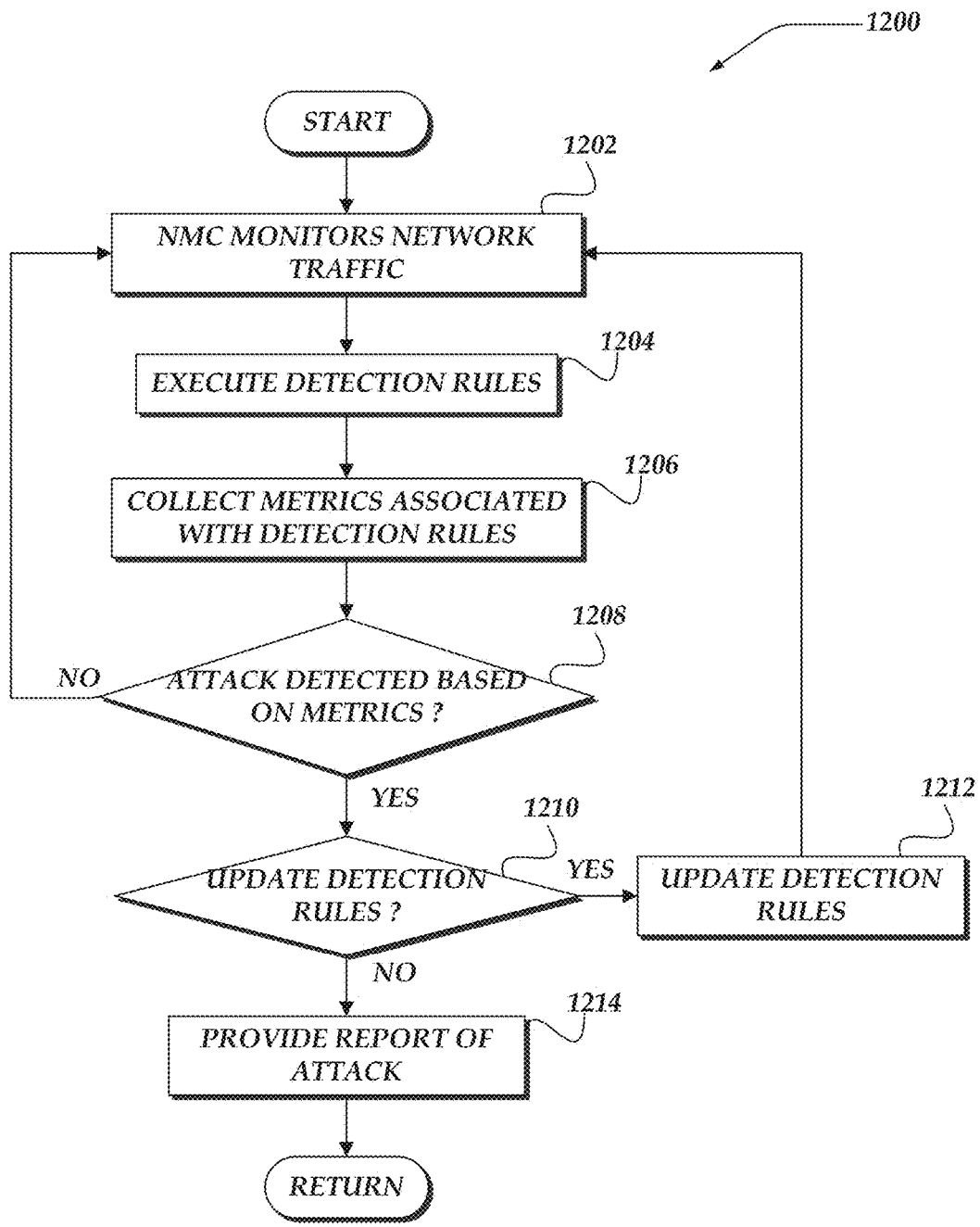
FIG. 12 illustrates an overview flowchart of an exemplary process for detecting one or more attacks and updating one or more detection rules.

FIG. 12 shows an overview flowchart of exemplary process 1200 for detecting one or more exemplary attacks and updating one or more exemplary detection rules. In one or more of the various embodiments, one or more blocks in process 1200 may represent one or more portions of one or more blocks in process 600 of FIG. 6. In some of the various embodiments, one or more blocks in process 1100 may represent one or more portions of one or more blocks in process 900 of FIG. 9. In some embodiments, one or more NMCs may execute one or more portions of one or more blocks in process 1200. For example, the one or more NMCs may be the same as or similar to the one or more NMCs explained with regard to process 600 of FIG. 6.

After a start block, at block 1202, in one or more of the various embodiments, one or more NMCs may be arranged to monitor network traffic in one or more networks (e.g., as explained with regard to block 602 of process 600 of FIG. 6).

In some embodiments, the NMC may be arranged to continuously capture network packets that may be associated with one or more monitored network flows. Accordingly, in one or more of the various embodiments, the NMC may be arranged to selectively capture some or all of the network packets that may be monitored or otherwise observed by the NMC. The selection of network packets for capture may be based on the operation of one or more rule-based policies, pattern matches, configuration settings, or the like, or combination thereof.

In one or more of the various embodiments, captured network packets may be stored temporally in ring buffer memories. Also, in one or more of the various embodiments, captured network packets may be stored in persistent data storage, such as disk drives, storage area networks (SANs), solid-state drives, cloud-based storage environments, or the like, or combination thereof.

At block 1204, in one or more of the various embodiments, the one or more NMCs may execute one or more detection rules (e.g., as explained with regard to block 604 of process 600 FIG. 6).

At block 1206, the one or more NMCs may collect one or more metrics associated with the one or more detection rules (e.g., as explained with regard to block 606 of process 600 of FIG. 6).

At decision block 1208, the one or more NMCs may determine whether one or more attacks have been detected based on one or more portions of the one or more collected metrics (e.g., as explained with regard to block 608 of process 600 of FIG. 6). If no attacks are detected, process 1200 may return to block 1202 to continue monitoring network traffic. If one or more attacks are detected, process 1200 may proceed to block 1210.

At decision block 1210, in one or more of the various embodiments, the one or more NMCs may determine whether to update the one or more detection rules. In one or more of the various embodiments, the one or more NMCs may execute one or more policies (e.g., one or more rule-based policies defined by one or more portions of configuration information, such as, for example, configuration information of ransomware detection engine 326) that instruct the one or more NMCs to update the one or more detection rules based on one or more of metrics, metric scores, confidence scores, or the like. The one or more of metrics, metric scores, confidence scores, or the like may include one or more of those metrics, metric scores, confidence scores, or the like explained above. In some of the various embodiments, the one or more NMCs may compare the one or more of metrics, metric scores, confidence scores, or the like to one or more thresholds. In some embodiments, the one or more NMCs may, based on the one or more policies, update the one or more detection rules responsive to determining that the one or more thresholds have been met or exceeded (or have not been met or exceeded). For example, the one or more NMCs may update the one or more detection rules responsive to determining that, while the one or more NMCs detected the one or more attacks, a likelihood of a false positive is higher than a threshold. In one or more embodiments, the one or more NMCs may adjust the one or more detection rules to reduce false positives. For example, the one or more NMCs may update the one or more detection rules and determine whether the one or more NMCs again detect the one or more detected attacks while executing the one or more updated detection rules. In some embodiments, the one or more NMCs may, based on the one or more policies, update the one or more detection rules based on user input (e.g., one or more users indicating that the one or more detected attacks are one or more false positives). If the one or more NMCs determine that the one or more policies require updating the one or more detection rules, process 1200 may proceed to block 1212. If the one or more NMCs determine that the one or more policies permit skipping one or more various updates to the one or more detection rules, process 1200 may proceed to block 1214. In one or more of the various embodiments, the one or more NMCs may determine that the one or more policies permit updating the one or more detection rules (e.g., as explained with regard to block 1212) and proceeding to block 1214. For example, the one or more NMCs may adjust one or more previously updated detection rules to one or more pre-updated states (e.g., responsive to determining that one or more prior detections of the one or more detected ransomware was not a false positive).

At block 1212, the one or more NMCs may update the one or more detection rules. In one or more of the various embodiments, the one or more NMCs may update the one or more detection rules based on the one or more of metrics, metric scores, confidence scores, or the like. In some of the various embodiments, the one or more NMCs may employ one or more forms of rule learning to update the one or more rules. In some embodiments, the one or more NMCs may add one or more pieces of file information (e.g., one or more filenames, file extensions, or the like) to one or more blacklists or whitelists (e.g., as found in blacklist information 316 or whitelist information 318 of FIG. 3). In one or more embodiments, the one or more NMCs may subtract one or more pieces of file information from one or more blacklists (e.g., as found in blacklist information 316 of FIG. 3). In some of the various embodiments, the one or more NMCs may output one or more new or updated blacklists or whitelists to one or more perimeter defenses (e.g., one or more firewalls) or agent-based antivirus tools in the one or more portions of the one or more networks or in one or more portions of one or more other networks. In some embodiments, the one or more NMCs may reset one or more collected metrics (e.g., resetting one or more counts, emptying one or more arrays, or the like). In one or more embodiments, the one or more NMCs may adjust the one or more thresholds (e.g., decrease one or more thresholds, increase one or more thresholds, or the like). In some embodiments, the one or more NMCs may change which packets or portions of packets that the one or more NMCs analyze with the one or more detection rules. For example, the one or more NMCs may increase a quantity or spectrum of packets or packet portions that the one or more NMCs analyze with the one or more detection rules. In some of the various embodiments, the one or more NMCs may update the one or more detection rules based on user feedback.

At block 1214, the one or more NMCs may provide one or more reports of the one or more detected attacks (e.g., as explained with regard to block 610 of process 600 of FIG. 6). In one or more of the various embodiments, the one or more NMCs may execute one or more of decision block 1210 or block 1212 subsequent to block 1214. For example, the one or more NMCs may prompt one or more users for feedback at or subsequent to block 1214 and base one or more portions of decision block 1210 on the user feedback.

Subsequent to block 1214, control may be returned to a calling process. In some embodiments, the one or more NMCs may continue operating until a user configures the one or more NMCs to terminate operations.

In one or more of the various embodiments, the one or more NMCs may, by performing one or more portions of one or more of processes 600, 700, 800, 900, 1000, 1100, 1200, or 1300, improve performance of one or more of client computers or network computers. In some of the various embodiments, if one or more agents in the one or more client computers were to perform the one or more portions of the one or more processes, processing by the one or more client computers may slow down. In some embodiments, if one or more firewalls in one or more network computers were to perform the one or more portions of the one or more processes, processing by the one or more network computers may slow down, and speed at which the one or more client computers may communicate through the one or more firewalls may also slow down. In one or more embodiments, by performing passive analysis, the one or more NMCs may perform the one or more portions of the one or more processes without adding overhead to communications by the one or more client computers.

In one or more of the various embodiments, the one or more NMCs may, by executing detection rules, improve performance of the one or more of client computers or network computers. In some of the various embodiments, if the one or more NMCs were to consider all methods (or operations), the one or more NMCs may require excessive overhead to perform one or more portions of one or more of processes 600, 700, 800, 900, 1000, 1100, 1200, or 1300. In some embodiments, by considering particular types of file operations (e.g., file write operations), combinations of file operations, or the like, the one or more NMCs may reduce overhead requirements to perform the one or more portions of the one or more of processes 600, 700, 800, 900, 1000, 1100, 1200, or 1300.

Figure 13:
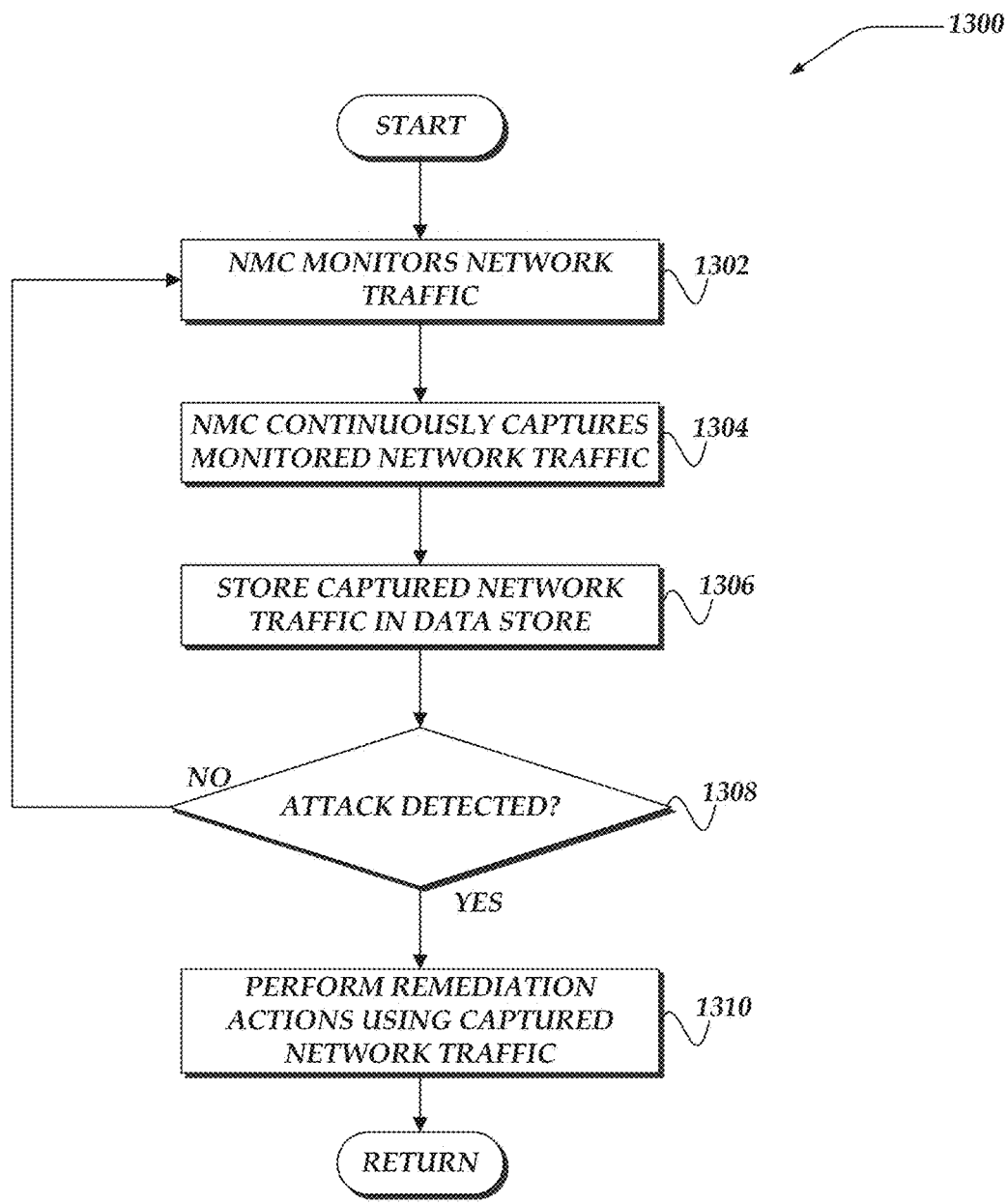
FIG. 13 shows a flowchart of a process which may be an example a network monitoring computer arranged for continuous capture of network traffic in accordance with one or more of the various embodiments.

FIG. 13 shows a flowchart of process 1300 which is an example a network monitoring computer arranged for continuous capture of network traffic in accordance with one or more of the various embodiments. After a start block, at block 1302, one or more NMCs may be arranged to monitor network traffic of one or more network flows in one or more networks (e.g., as explained with regard to block 602 of process 600 of FIG. 6).

At block 1304, in one or more of the various embodiments, one or more NMCs may be arranged to continuously capture network traffic that may be associated with one or more monitored network flows. Accordingly, in one or more of the various embodiments, the NMC may be arranged to selectively capture some or all of the network packets that may be monitored or otherwise observed by the NMC. The selection of network packets for capture may be based on the operation of one or more rule-based policies, pattern matches, configuration settings, or the like, or combination thereof.

At block 1306, in one or more of the various embodiments, the captured network packets may be stored in persistent data storage, such as disk drives, solid-state drives, storage area networks (SANs), cloud-based storage environments, or the like, or combination thereof.

At decision block 1308, in one or more of the various embodiments, if an attack may be detected, control may flow to block 1310; otherwise, control may loop back to block 1302. In one or more of the various embodiments, one or more NMC may be arranged to detect attacks as detailed above.

At block 1310, in one or more of the various embodiments, one or more NMCs may be arranged to perform one or more remediation actions based on the captured network traffic. In some embodiments, the captured network traffic may include original copies of file information (or other data) that may be used to recover from an attack. (See, FIG. 11 and its corresponding description above.) Next, control may be returned to a calling process.

It will be understood that each block of the flowchart illustration, and combinations of blocks in the flowchart illustration, can be implemented by computer program instructions. These program instructions may be provided to one or more processors to produce a machine, such that the instructions, which execute in the one or more processors, create means for implementing the actions specified in the flowchart block or blocks. The computer program instructions may be executed by the one or more processors to cause a series of operational steps to be performed by the one or more processors to produce a computer-implemented process such that the instructions, which execute in the one or more processors to provide steps for implementing the actions specified in the flowchart block or blocks. The computer program instructions may also cause one or more portions of one or more of the operational steps shown in the blocks of the flowchart to be performed in parallel or concurrently by the one or more processors or one or more computers. Moreover, some of the steps may also be performed across more than one processor or computer. In addition, one or more blocks or combinations of blocks in the flowchart illustration may also be performed concurrently with other blocks or combinations of blocks, or even in a different sequence than illustrated without departing from the scope or spirit of the innovations.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of one or more of the various embodiments of the innovations.

Further, in one or more embodiments (not shown in the figures), the logic in the illustrative flowcharts may be executed using one or more embedded logic hardware devices instead of one or more CPUs, such as an Application Specific Integrated Circuits (ASICs), Field Programmable Gate Arrays (FPGAs), Programmable Array Logic chips (PALs), or the like, or combination thereof. The embedded one or more logic hardware devices may directly execute their embedded logic to perform actions. In one or more embodiments, one or more microcontrollers may be arranged as system-on-a-chip (SOCs) to directly execute their own locally embedded logic to perform actions and access their own internal memory and their own external Input and Output Interfaces (e.g., hardware pins or wireless transceivers) to perform actions described herein.

What is claimed as new and desired to be protected by Letters Patent of the United States is:

1. A method for detecting one or more attacks on one or more networks, wherein one or more processors of one or more network monitoring computers (NMCs) execute instructions to perform actions, comprising:
    instantiating one or more network monitoring engines to passively monitor one or more network flows; and
    responsive to the one or more network monitoring engines detecting one or more file write operations based on information included in one or more packets of the one or more network flows, performing further actions, including:
        instantiating an attack detection engine to perform actions, including:
            executing one or more detection rules to analyze one or more portions of the one or more packets to identify file information that is associated with the one or more file write operations;
            providing one or more metrics based on the one or more detection rules and a comparison of the one or more of the file information or the one or more file write operations;
            in response to the one or more metrics indicating occurrence of the one or more attacks in the network, selectively extracting one or more portions of file data from read packets associated with one or more file read operations; and
            employing the one or more extracted portions of file data to provide one or more files to one or more client computers.

2. The method of claim 1, wherein the attack detection engine performs further actions, including providing one or more reports of the one or more attacks based on one or more exceeded threshold values for one or more of the one or more metrics.

3. The method of claim 1, wherein the attack detection engine performs further actions, including remediating the one or more attacks by providing recovery of previously stored original copies of the file data.

4. The method of claim 1, wherein the attack detection engine performs further actions, including improving performance of the one or more NMCs by employing the one or more detection rules to monitor less than all types of file operations.

5. The method of claim 1, wherein the attack detection engine performs further actions, including updating the one or more detection rules based on feedback from one or more users of one or more client computers.

6. The method of claim 1, wherein the attack detection engine performs further actions, including providing one or more periods of time within which the one or more attacks began.

7. The method of claim 1, wherein the selective extraction of the one or more portions of file data is based on one or more directions of read packets associated with one or more file read operations.

8. A system for detecting one or more attacks in one or more networks, comprising:
    a plurality of network monitoring computers (NMCs), wherein one or more processors of the plurality of NMCs execute instructions to perform actions, comprising:
        instantiating one or more network monitoring engines to passively monitor one or more network flows; and
        responsive to the one or more network monitoring engines detecting one or more file write operations based on information included in one or more packets of the one or more network flows, performing further actions, including:
            instantiating an attack detection engine to perform actions, including:
                executing one or more detection rules to analyze one or more portions of the one or more packets to identify file information that is associated with the one or more file write operations;
                providing one or more metrics based on the one or more detection rules and a comparison of the one or more of the file information or the one or more file write operations;
                in response to the one or more metrics indicating occurrence of the one or more attacks in the network, selectively extracting one or more portions of file data from read packets associated with one or more file read operations; and
                employing the one or more extracted portions of file data to provide one or more files to one or more client computers.

9. The system of claim 8, wherein the attack detection engine performs further actions, including providing one or more reports of the one or more attacks based on one or more exceeded threshold values for one or more of the one or more metrics.

10. The system of claim 8, wherein the attack detection engine performs further actions, including remediating the one or more attacks by providing recovery of previously stored original copies of the file data.

11. The system of claim 8, wherein the attack detection engine performs further actions, including improving performance of the plurality of NMCs by employing the one or more detection rules to monitor less than all types of file operations.

12. The system of claim 8, wherein the attack detection engine performs further actions, including updating the one or more detection rules based on feedback from one or more users of one or more client computers.

13. The system of claim 8, wherein the attack detection engine performs further actions, including providing one or more periods of time within which the one or more attacks began.

14. The system of claim 8, wherein the selective extraction of the one or more portions of file data is based on one or more directions of read packets associated with one or more file read operations.

15. A network computer for detecting one or more attacks in one or more networks, comprising:
one or more memories that store one or more instructions; and
one or more processors that execute the one or more instructions to perform actions, including:
instantiating one or more network monitoring engines to passively monitor one or more network flows; and
responsive to the one or more network monitoring engines detecting one or more file write operations based on information included in one or more packets of the one or more network flows, performing further actions, including:
instantiating an attack detection engine to perform actions, including:
executing one or more detection rules to analyze one or more portions of the one or more packets to identify file information that is associated with the one or more file write operations;
providing one or more metrics based on the one or more detection rules and a comparison of the one or more of the file information or the one or more file write operations;
in response to the one or more metrics indicating occurrence of the one or more attacks in the network, selectively extracting one or more portions of file data from read packets associated with one or more file read operations; and
employing the one or more extracted portions of file data to provide one or more files to one or more client computers.

16. The network computer of claim 15, wherein the attack detection engine performs further actions, including remediating the one or more attacks by providing recovery of previously stored original copies of the file data.

17. The network computer of claim 15, wherein the attack detection engine performs further actions, including improving performance of the network computer by employing the one or more detection rules to monitor less than all types of file operations.

18. The network computer of claim 15, wherein the attack detection engine performs further actions, including updating the one or more detection rules based on feedback from one or more users of one or more client computers.

19. The network computer of claim 15, wherein the attack detection engine performs further actions, including providing one or more periods of time within which the one or more attacks began.

20. The network computer of claim 15, wherein the selective extraction of the one or more portions of file data is based on one or more directions of read packets associated with one or more file read operations.

* * * * *